United States Patent
Albertson et al.

(10) Patent No.: US 10,028,433 B1
(45) Date of Patent: *Jul. 24, 2018

(54) DEBRIS DEFLECTOR FOR STRING TRIMMER

(71) Applicants: Robert V. Albertson, Alma, WI (US); Deah L. Udell, Wayzata, MN (US)

(72) Inventors: Robert V. Albertson, Alma, WI (US); Deah L. Udell, Wayzata, MN (US)

( * ) Notice: Subject to any disclaimer, the term of this patent is extended or adjusted under 35 U.S.C. 154(b) by 113 days.

This patent is subject to a terminal disclaimer.

(21) Appl. No.: 14/088,416

(22) Filed: Nov. 24, 2013

Related U.S. Application Data

(63) Continuation-in-part of application No. 12/927,916, filed on Nov. 29, 2010, now Pat. No. 8,590,166, and a continuation-in-part of application No. 29/348,803, filed on Feb. 12, 2010, now Pat. No. Des. 628,034.

(51) Int. Cl.
*A01D 34/416* (2006.01)

(52) U.S. Cl.
CPC ................ *A01D 34/4167* (2013.01)

(58) Field of Classification Search
CPC ................................................ A01D 34/4167
USPC ............. 30/276, 277.4, DIG. 5; D8/8, 354; 56/12.7, 17; D15/141
See application file for complete search history.

(56) References Cited

U.S. PATENT DOCUMENTS

| | | |
|---|---|---|
| 2,914,902 A | 12/1959 | Beymer |
| 2,945,543 A | 7/1960 | Beyer |
| 3,474,608 A | 10/1969 | Frick |
| 4,200,978 A | 5/1980 | Irelan et al. .................... 30/276 |
| D268,640 S | 4/1983 | Bonforte |
| D268,641 S | 4/1983 | Bonforte |
| D270,574 S * | 9/1983 | Black ............................ D25/68 |
| D274,803 S * | 7/1984 | Hughes ........................ D12/126 |
| 4,550,499 A | 11/1985 | Ruzicka ......................... 30/276 |
| 4,587,800 A * | 5/1986 | Jimenez ................ A01G 3/062 56/17.2 |
| 4,651,422 A | 3/1987 | Everts ............................ 56/12.7 |
| 4,712,363 A * | 12/1987 | Claborn ................. A01D 34/84 56/12.7 |
| 4,722,139 A | 2/1988 | Mahler ........................... 30/276 |
| 4,823,464 A | 4/1989 | Gorski ............................ 30/276 |
| 4,864,728 A | 9/1989 | Kloft et al. ..................... 30/276 |
| 4,872,265 A | 10/1989 | Powell ............................ 30/276 |
| 4,890,389 A * | 1/1990 | Whitkop ............ A01D 34/4167 30/276 |
| 5,060,383 A | 10/1991 | Ratkiewich ..................... 30/276 |
| 5,077,898 A | 1/1992 | Hartwig ......................... 30/276 |
| D342,874 S | 1/1994 | Groves |
| D347,150 S | 5/1994 | Falconbridge |
| 5,351,403 A | 10/1994 | Becker et al. .................. 30/276 |
| 5,385,005 A | 1/1995 | Ash ................................ 56/12.7 |
| 5,394,612 A | 3/1995 | Wolfington |

(Continued)

FOREIGN PATENT DOCUMENTS

KR   101078824 B1 * 11/2011

*Primary Examiner* — Jason Daniel Prone
(74) *Attorney, Agent, or Firm* — Richard John Bartz

(57) ABSTRACT

A string trimmer equipped with a knife and deflector apparatus mounted on the shroud directs cut debris laterally away from a workperson operating the string trimmer. A knife cutting edge located below the shroud cuts vegetation moved by the revolving string into cut debris. An upwardly extended radial deflector mounted on the shroud directs the cut debris laterally away from the shroud and workperson.

17 Claims, 25 Drawing Sheets

(56) References Cited

U.S. PATENT DOCUMENTS

| | | | |
|---|---|---|---|
| 5,400,576 A | 3/1995 | Smith | |
| D357,482 S | 4/1995 | Forbush | |
| 5,402,627 A * | 4/1995 | Trompler | A01D 34/90 56/12.7 |
| 5,423,126 A | 6/1995 | Byrne | 30/276 |
| 5,493,783 A | 2/1996 | Oostendorp | 30/276 |
| 5,524,349 A | 6/1996 | Dolin | 30/276 |
| D373,712 S | 9/1996 | Bridgers | D8/8 |
| 5,584,348 A | 12/1996 | Butler | 56/12.7 |
| D389,382 S | 1/1998 | Houle | |
| D391,586 S * | 3/1998 | Walker | D15/141 |
| D391,815 S | 3/1998 | Venezio | |
| D391,915 S * | 3/1998 | Miller | D12/223 |
| D394,632 S * | 5/1998 | Miller | D12/223 |
| D395,383 S | 6/1998 | Mohindru | |
| D398,283 S * | 9/1998 | Miller | D12/223 |
| 5,839,262 A | 11/1998 | Sorensen | 30/276 |
| D408,696 S | 4/1999 | Simpson, Sr. | |
| D409,077 S * | 5/1999 | Brooks | D8/354 |
| 5,924,205 A | 7/1999 | Sugihara et al. | 30/276 |
| 5,996,234 A | 12/1999 | Fowler et al. | 30/276 |
| 6,052,976 A * | 4/2000 | Cellini | A01D 34/4167 30/276 |
| 6,226,876 B1 | 5/2001 | Ezell | 30/276 |
| 6,324,765 B1 | 12/2001 | Watkins, Sr. | 30/276 |
| 6,327,782 B1 * | 12/2001 | Blevins | A01D 34/4167 30/276 |
| D463,230 S | 9/2002 | Robson | D8/8 |
| 6,568,642 B1 * | 5/2003 | Kirschner | F16L 3/04 248/220.1 |
| 6,655,034 B2 | 12/2003 | Richardson et al. | 30/276 |
| 6,658,741 B2 | 12/2003 | Paluszek | |
| 6,665,942 B2 | 12/2003 | Richardson et al. | 30/276 |
| 6,742,263 B2 | 6/2004 | Ellson et al. | 30/276 |
| 6,751,871 B2 | 6/2004 | Furnish | 30/276 |
| 6,757,980 B2 | 7/2004 | Arsenault | 30/286 |
| 6,842,985 B2 | 1/2005 | Richardson et al. | 30/276 |
| 6,892,461 B2 | 5/2005 | Peterson | 30/276 |
| 6,941,738 B1 * | 9/2005 | Standish | A01D 34/4167 56/12.7 |
| D520,322 S * | 5/2006 | Orlando | D8/354 |
| 7,284,331 B2 | 10/2007 | Paddock | 30/276 |
| D571,640 S * | 6/2008 | Misch | D8/354 |
| 7,406,771 B2 | 8/2008 | Zimmermann et al. | 30/276 |
| D588,881 S | 3/2009 | Spencer | |
| D608,183 S * | 1/2010 | Meyer | D8/354 |
| D615,848 S * | 5/2010 | Prichard | D8/354 |
| D628,034 S | 11/2010 | Albertson et al. | D8/8 |
| 7,836,602 B2 | 11/2010 | Langhans et al. | 30/276 |
| 7,963,041 B1 | 6/2011 | Smith | 30/347 |
| D645,313 S | 9/2011 | Albertson et al. | D8/8 |
| 8,256,120 B2 | 9/2012 | Million et al. | 56/12.8 |
| D672,287 S * | 12/2012 | Noble | D8/349 |
| D682,069 S * | 5/2013 | Lehane | D8/354 |
| 8,544,247 B2 * | 10/2013 | Cathcart | A01D 34/824 56/12.7 |
| 8,590,166 B1 * | 11/2013 | Albertson | A01D 75/206 30/276 |
| D729,043 S * | 5/2015 | Poppell | D8/354 |
| D730,545 S * | 5/2015 | Stauffer | D8/354 |
| D730,719 S * | 6/2015 | Sundberg | D8/354 |
| D732,708 S * | 6/2015 | Stauffer | D8/354 |
| D732,929 S * | 6/2015 | Harrow | D8/354 |
| D739,709 S * | 9/2015 | Wright | D8/354 |
| D745,346 S * | 12/2015 | Birgl | D8/14 |
| 2002/0007559 A1 | 1/2002 | Morabit et al. | 30/276 |
| 2002/0166244 A1 | 11/2002 | Williams | 30/276 |
| 2004/0031157 A1 | 2/2004 | Arsenault | 30/276 |
| 2005/0022392 A1 | 2/2005 | Hanes et al. | 30/276 |
| 2005/0183269 A1 | 8/2005 | Thompson | 30/276 |
| 2006/0112568 A1 | 6/2006 | Jerez | 30/276 |
| 2006/0123635 A1 | 6/2006 | Hurley et al. | 30/276 |
| 2006/0156552 A1 | 7/2006 | Schilling | 30/276 |
| 2007/0028459 A1 | 2/2007 | Thomson et al. | 30/276 |
| 2007/0074403 A1 | 4/2007 | Robison | 30/276 |
| 2007/0089302 A1 | 4/2007 | Paddock | |
| 2008/0141541 A1 * | 6/2008 | Hurley | 30/276 |
| 2008/0271325 A1 | 11/2008 | Hurley | 30/276 |
| 2008/0283702 A1 * | 11/2008 | Ikerd | E04B 1/2604 248/228.1 |
| 2009/0217637 A1 | 9/2009 | Dunn | 56/12.7 |
| 2011/0214294 A1 | 9/2011 | Galinski | 30/276 |
| 2013/0326887 A1 * | 12/2013 | Swan | A01D 34/4167 30/286 |
| 2015/0173293 A1 * | 6/2015 | Hutchins | A01D 34/4167 30/276 |

\* cited by examiner

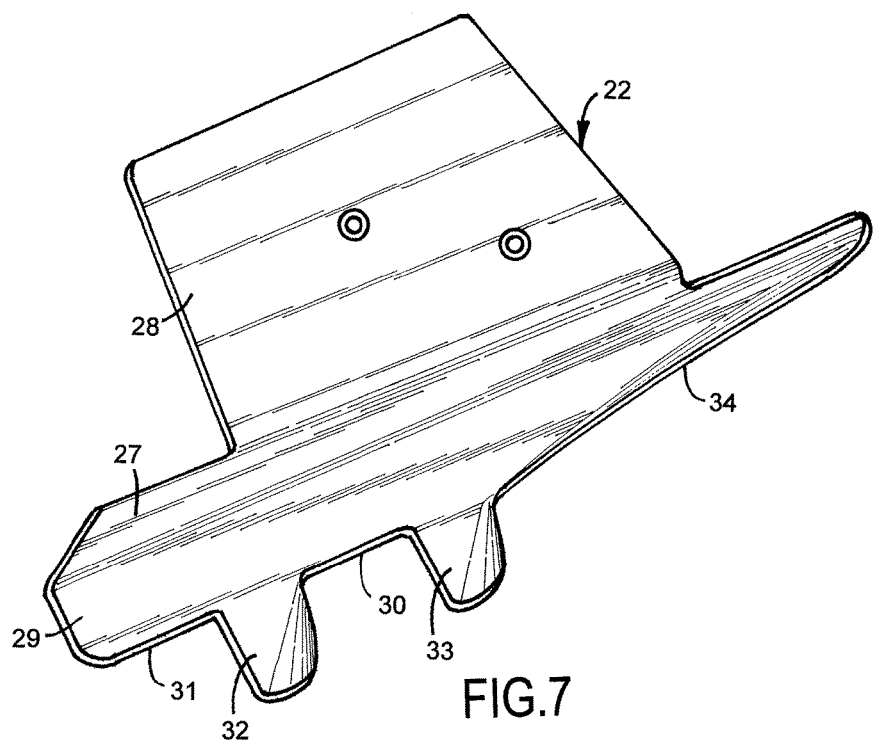
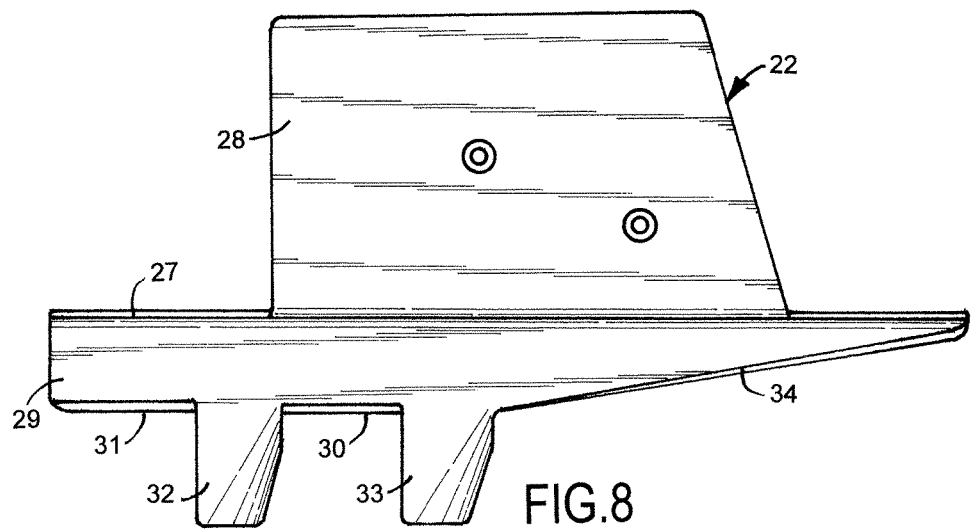

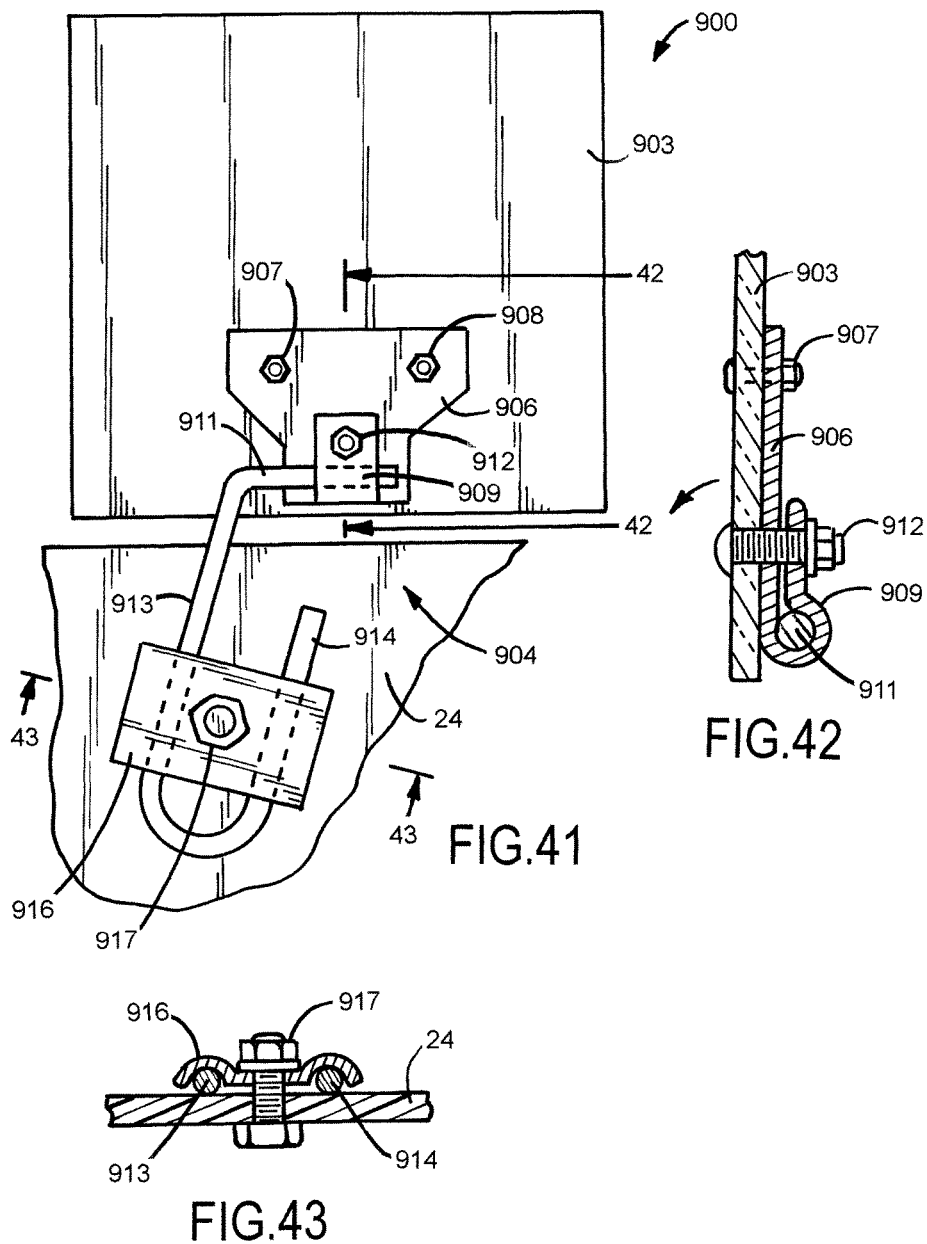

DEBRIS DEFLECTOR FOR STRING TRIMMER

CROSS REFERENCE TO RELATED APPLICATION

This application is a continuation-in-part of U.S. application Ser. No. 29/348,803 filed Feb. 12, 2010, U.S. application Ser. No. 29/370,537 filed Aug. 2, 2010, and U.S. application Ser. No. 12/927,916 filed Nov. 29, 2010, now U.S. Pat. No. 8,590,166.

FIELD OF THE INVENTION

The invention relates to string trimmers for cutting vegetation, such as grass, weeds, hay and crops, having shields to protect the workpersons operating the string trimmers and knives for cutting the vegetation.

BACKGROUND OF THE INVENTION

String trimmers have internal combustion engines or electric motors mounted on wands or tubular shafts connected to rotary string cutting heads for cutting grass, weeds and vegetation. Guards and shrouds mounted on the cutting heads or shafts above the rotating strings are limited in size and shape. They do not adequately protect the workperson from grass clippings, debris, and objects being thrown rearwardly over the shrouds onto the legs and feet of the workperson operating the string trimmer. Shields and skirts for string trimmers are disclosed in the prior art to prevent grass cuttings and debris from being directed toward the legs and feet of the workperson using the string trimmer. Examples of these string trimmers with shields and skirts are present in the following U.S. Patents.

A. V. Ruzicka in U.S. Pat. No. 4,550,499 discloses a string trimmer having a debris shield mounted above at least an arc of the cutting path of the cord. Cutting blades extend in an upright direction below the shield to cut the end of the cord. The cut segments of the cord are collected in a pocket.

M. Kloft and G. Zerrer in U.S. Pat. No. 4,864,728 discloses a brush cutter having a motor driven cutting tool for cutting vegetation. A protective cover plate overlaps the cutting tool. A downwardly extending wall supports a detachable skirt that projects below the wall and beneath the rotational plane of the cutting tool. The skirt deflects stones and other hard objects propelled by the cutting tool to protect the operator against injury.

S. E. Byrne in U.S. Pat. No. 5,423,126 discloses a flail trimmer having a handle comprising a fixed tubular shaft. A guide and first guard is clamped on the shaft. A rotatable cutting head has a flexible flail. A second guard extends along a 90 degree position of the circumference of the first guard between the flail and operator during use. A flail cutter extends downwardly from the first guard to cut the flail to the proper length. The knife is not located between the first guard and the plane of rotation of the flail. The second guard includes a rear vertical wall extending in an outward direction through the plane of rotation of the flail to act as a shield between the flail and the operator.

T. E. Ezell in U.S. Pat. No. 6,226,876 describes a debris shield for a string trimmer having an elongated shaft connected to string cutting head. The shield has a bracket mount on the shaft above the cutting head. The shield extends downward to generally contact the ground to prevent grass cuttings from being thrown under the shield onto the legs and feet of the user.

Paluszek in U.S. Pat. No. 6,658,741 discloses a cutting member mounted on a guard after string trimmers that cuts vegetation in concert with the rotating string. The cutting member mounted on the bottom of the guard has an L-shaped knife with a cutting edge that extends forwardly of the forward edge of the guard. The string strikes vegetation against the knife whereby the vegetation is cut by the string and knife. The knife acts to second cut the vegetation in a mulching effect.

C. W. Paddock in U.S. Patent Application Publication 2007/0089302 discloses a foldable skirt mounted on a grass trimmer shaft rearwardly of a shroud located over a string cutting head. Arms pivotally mounted on a clamp mounted on a shaft support the skirt rearwardly of the shroud and string cutting head to provide protection of the workperson from flying grass and debris.

SUMMARY OF THE INVENTION

A string trimmer having a motor driven cord located below a shroud is equipped with a knife and deflector for cutting vegetation, such as grass, weeds, hay and plants, and directing cut debris generally laterally away from the shroud and workperson operating the string trimmer. The knife has a radial knife edge located below the shroud and above the circular path of the moving cord whereby vegetation is forced into contact with the knife edge by the moving cord thereby cutting the vegetation into debris. The deflector is an upward directed radial extended generally flat plate located above the shroud and above the plane of rotation of the moving cord. The plate has a front face that directs air and debris generally laterally away from the shroud and workperson operating the string trimmer. A support joined to the deflector retains the deflector on the shroud. At least one fastener secures the support to the shroud. In alternative embodiments of the invention, the shroud and deflector are a one-piece member. The one-piece member is a molded plastic combined shroud and deflector. In another embodiment of the invention, a support fastened to the shroud is connected with a hinge assembly to a deflector plate. The hinge assembly allows the angle of deflector plate to be adjacent relative to the shroud.

DESCRIPTION OF THE DRAWING

FIG. 7 is a perspective view of the knife apparatus of FIG. 2;

FIG. 8 is a top plan view of the knife apparatus of FIG. 2;

FIG. 41 is a plan view of the adjustable connection assembly joining the debris deflector plate to the shroud of the string trimmer;

FIG. 42 is an enlarged sectional view taken along line 42-42 of FIG. 40; and

FIG. 43 is an enlarged sectional view taken along line 43-43 of FIG. 40.

DESCRIPTION OF THE INVENTION

Figure 1:
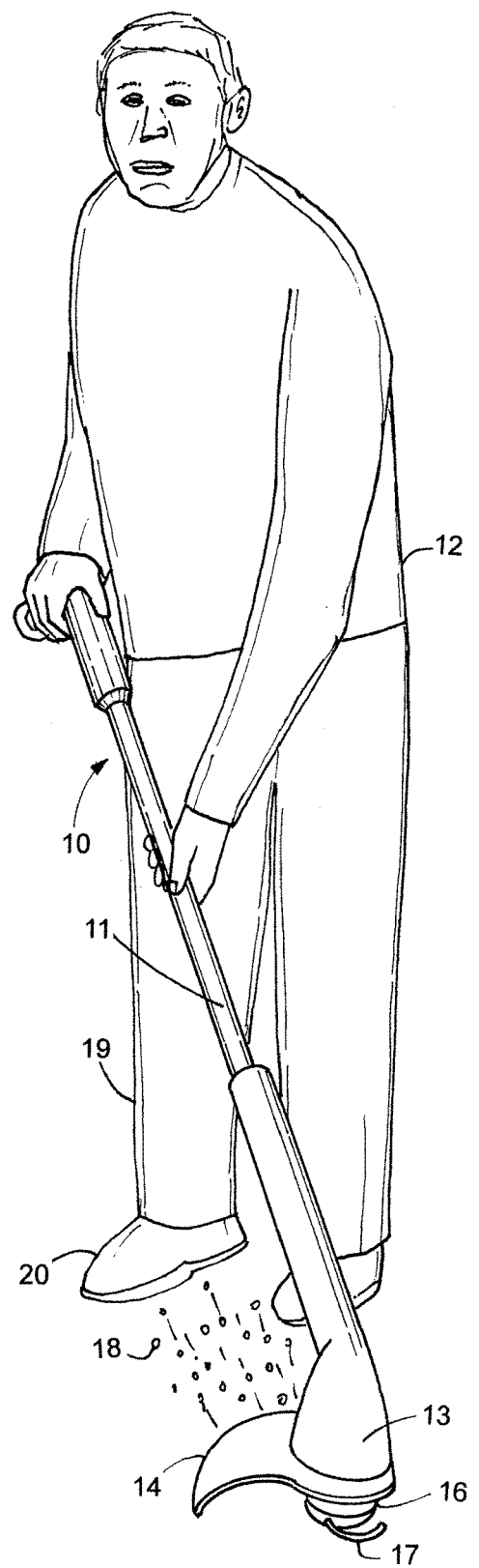
FIG. 1 is perspective view of a prior art string trimmer used by a workperson for cutting grass with grass debris propelled and splattered on the legs and feet of the workperson.
Figure 2:
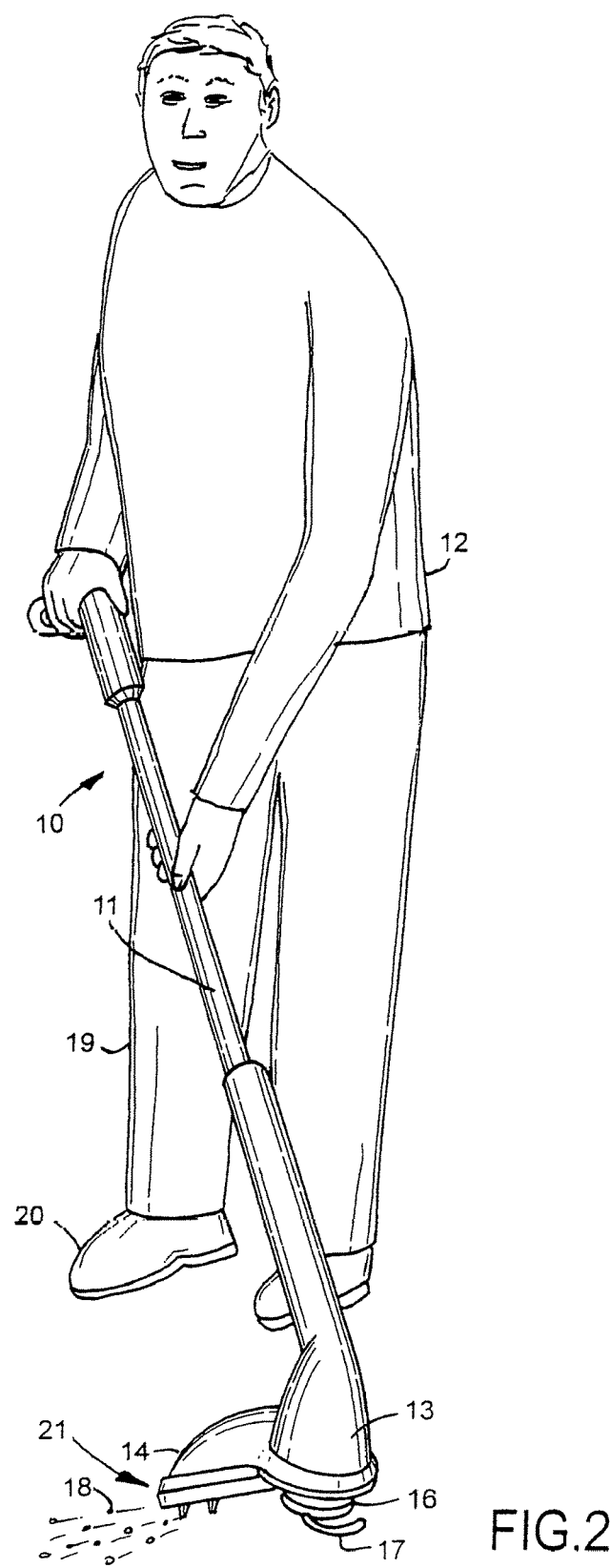
FIG. 2 is a perspective view of a string trimmer equipped with a first embodiment of a debris deflector and knife apparatus used by a workperson for cutting grass.
Figure 3:
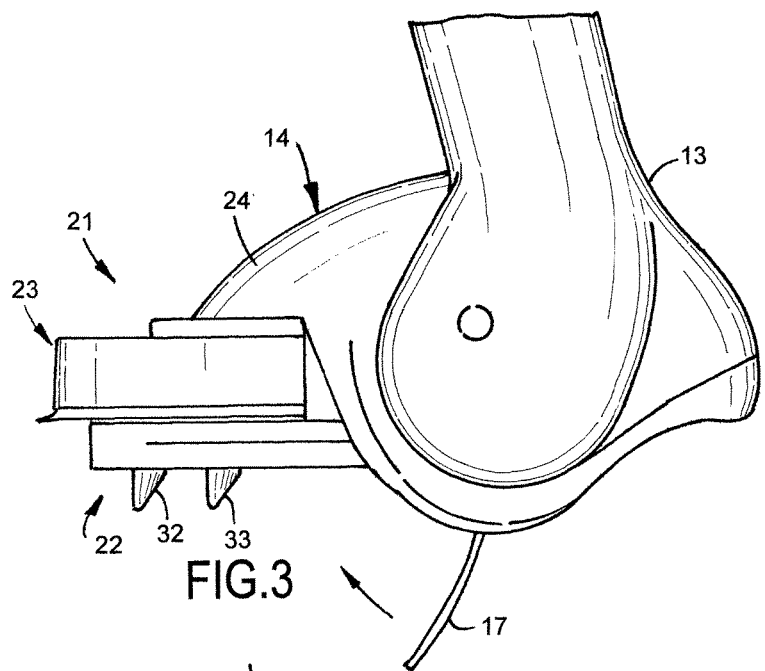
FIG. 3 is an enlarged top plan view of the string trimmer cutting head housing, shroud and combined debris deflector and knife apparatus of FIG. 2.
Figure 4:
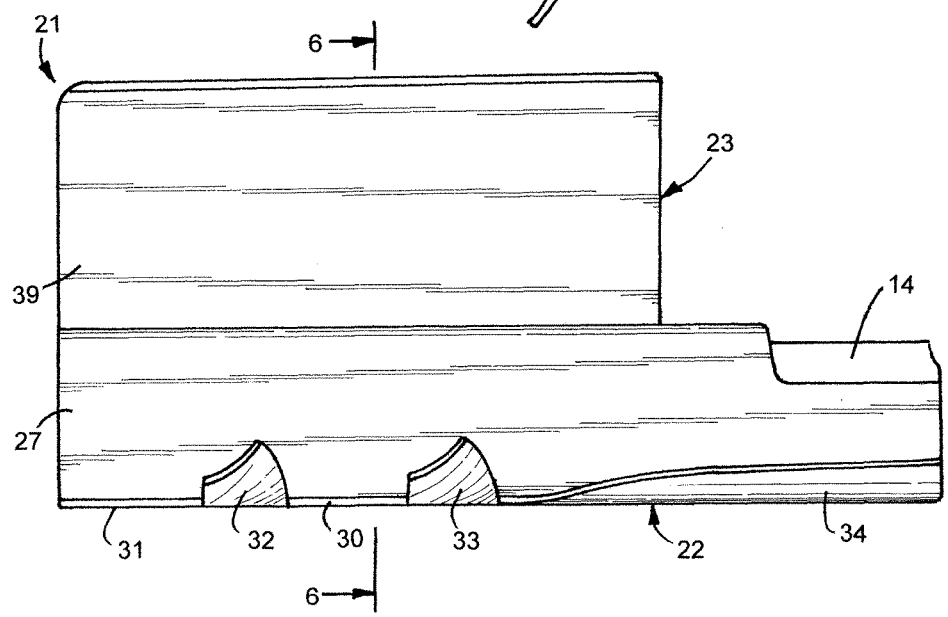
FIG. 4 is an enlarged front elevational view of the combined debris deflector and knife apparatus of FIG. 3.

As shown in FIG. 1, conventional string trimmers 10 has an elongated handle 11 used by a workperson 12 to cut grass, weeds, hay and plants. String trimmer 10 has a cutting head 13 containing a motor drivably connected to a spool or cutting head 16 operatively connected to a string or cord 17, such as an elongated flexible plastic filament. The motor turns cord 17 in a circumferential path. A housing or shroud 14 mounted on head 13 extends rearwardly and above the path of the moving cord 17. The moving turns cord 17 cuts the vegetation, such as grass, weeds, hay, and plants and propels and drives cut debris and objects along with air rearwardly to unhappy workperson's legs 19 and feet 20. The debris can include sticks, stones and dirt along with grass and weed clippings that impinge on workperson's legs 19 and feet 20. This is a dirty and untidy working environment which can injure the workperson 12.

The first embodiment of the combined deflector and knife apparatus 21 of the invention, shown in FIGS. 2 to 8, operates to cut vegetative, such as grass, weeds, hay and plants and direct the cut debris 18 laterally away from workperson 12. Debris 18 does not impinge on legs 19 and feet 20 of happy workperson 12. Apparatus 21 has a knife 22 and deflector 23 mounted on the top wall 24 of shroud 14. Knife 22 located adjacent the front of the shroud side wall 26 extends inwardly above the circular path of cord 17. As shown in FIGS. 4 and 6 to 8, knife 22 has a downwardly extended front wall 27 joined to a horizontal top wall 28. Fasteners 36 and 37, shown as nut and bolt assemblies, mount top wall 28 on top of shroud wall 24. Knife 22 has a radial knife section 29 joined to the bottom of front wall 27. The front of knife section has a pair of cutting edges 30 and 31. An upwardly and outwardly curved finger 32 separates cutting edges 30 and 31. A second upwardly and outwardly curved finger 33 separates cutting edge 30 with an inwardly directed upwardly curved section 34. The upwardly curved fingers 32 and 33 and section 34 prevent cord 17 from being cut by knife edges 30 and 31.

Figure 5:
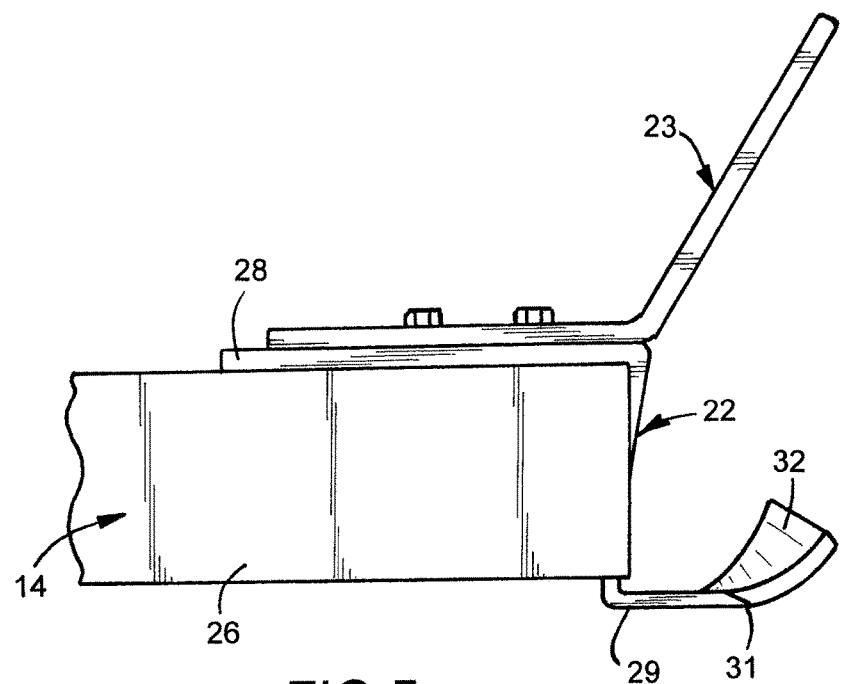
FIG. 5 is an end elevational view of the left end of FIG. 4.
Figure 6:
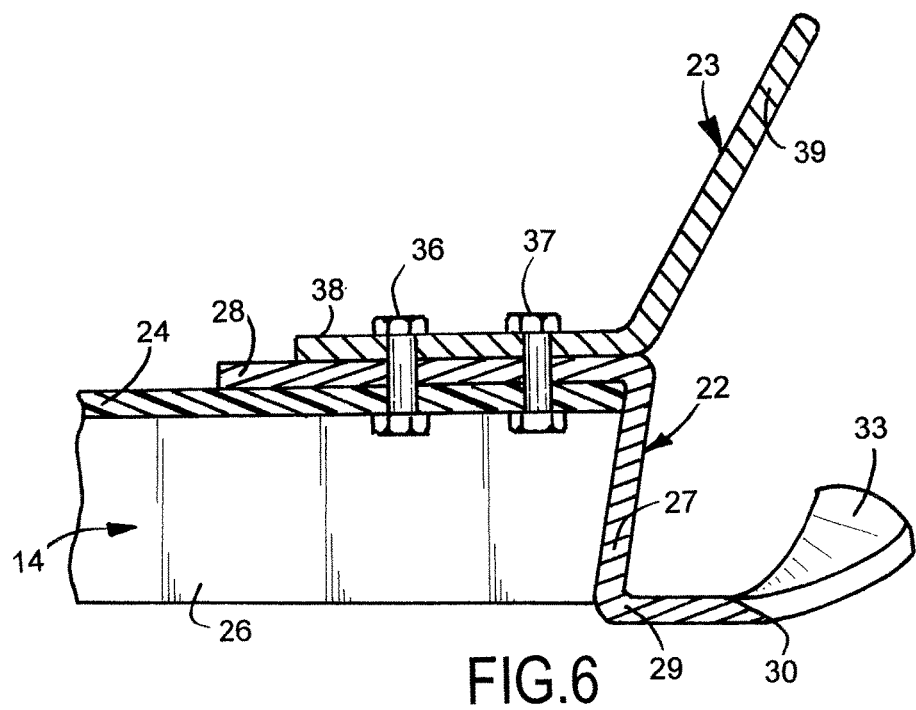
FIG. 6 is a sectional view taken along line 6-6 of FIG. 4.
Figure 9:
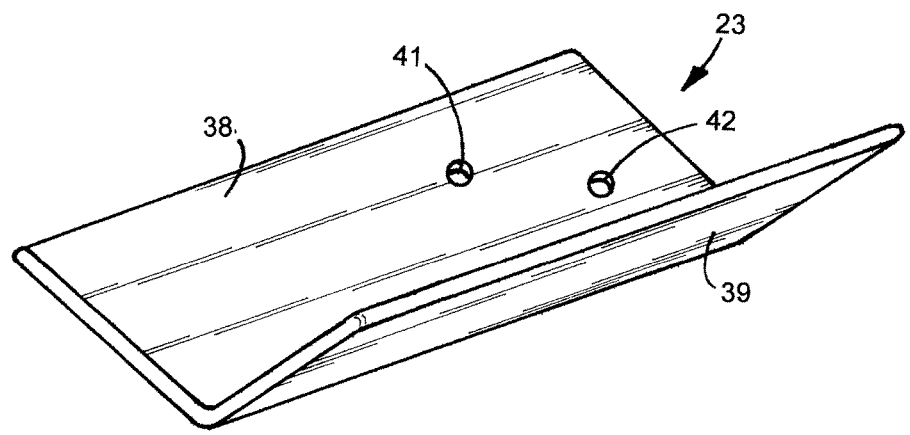
FIG. 9 is a perspective view of the debris deflector of FIG. 2.
Figure 10:
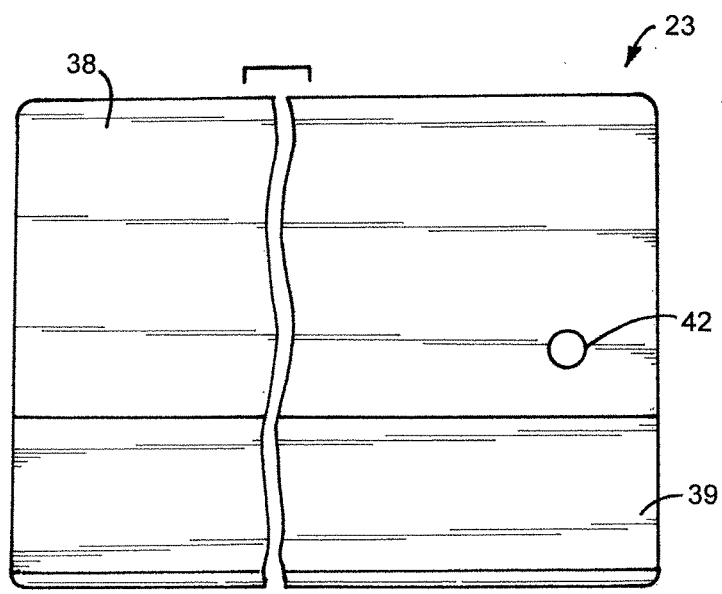
FIG. 10 is a foreshortened enlarged top plan view of the debris deflector of FIG. 2.
Figure 11:
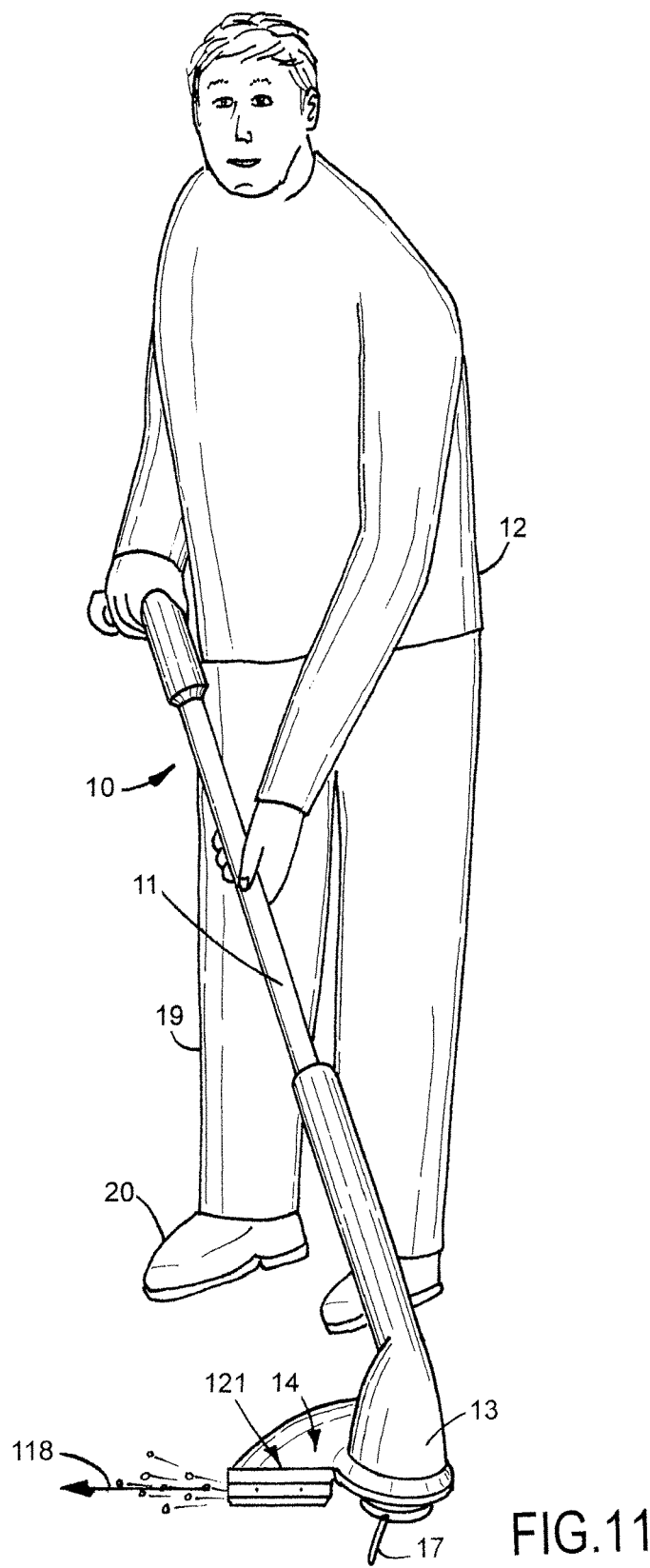
FIG. 11 is a perspective view of a string trimmer equipped with a second embodiment of a debris deflector and knife apparatus used by a workperson for cutting grass.
Figure 12:
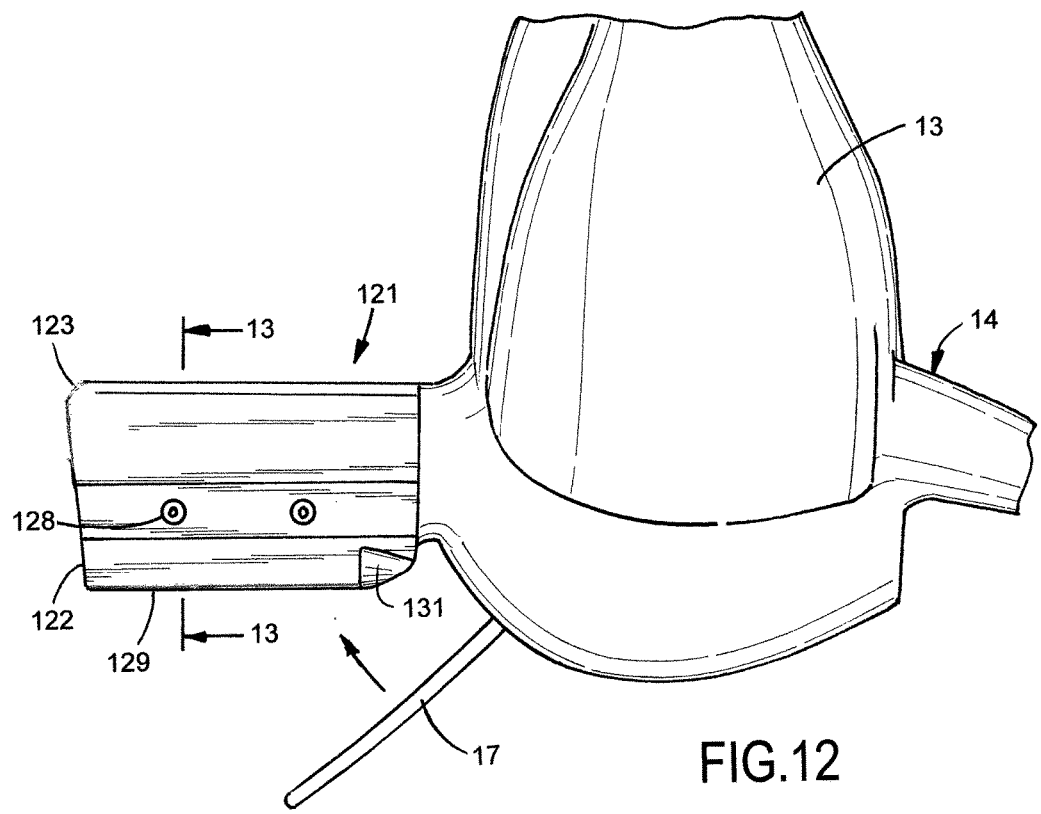
FIG. 12 is an enlarged front elevational view of the debris deflector and knife apparatus on the shroud of the string trimmer of FIG. 11.
Figure 13:
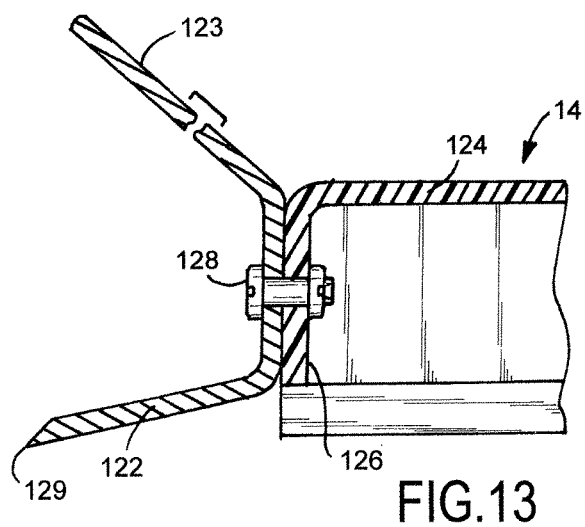
FIG. 13 is a foreshortened sectional view taken along line 13-13 of FIG. 12.
Figure 14:
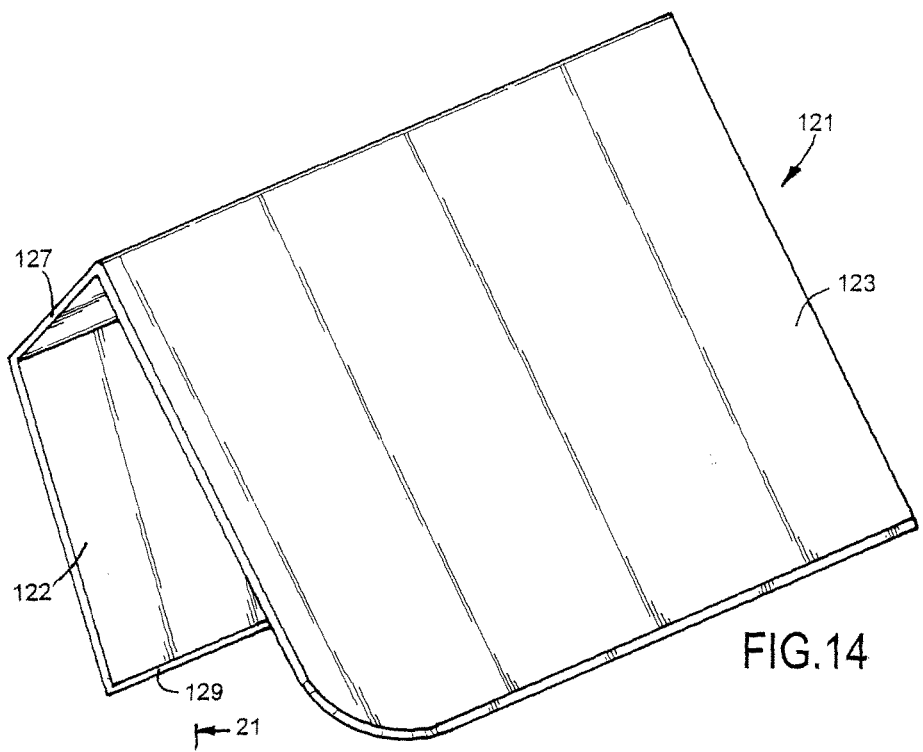
FIG. 14 is an enlarged perspective view of the debris deflector and knife apparatus of FIG. 12.
Figure 15:
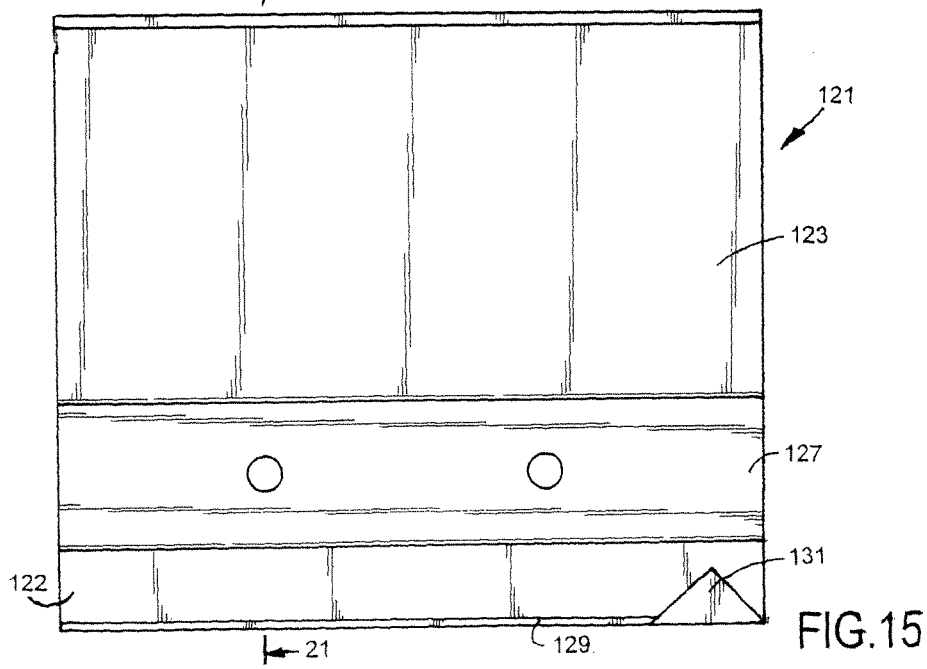
FIG. 15 is an enlarged front elevational view of the debris deflector and knife apparatus of FIG. 12.
Figure 16:
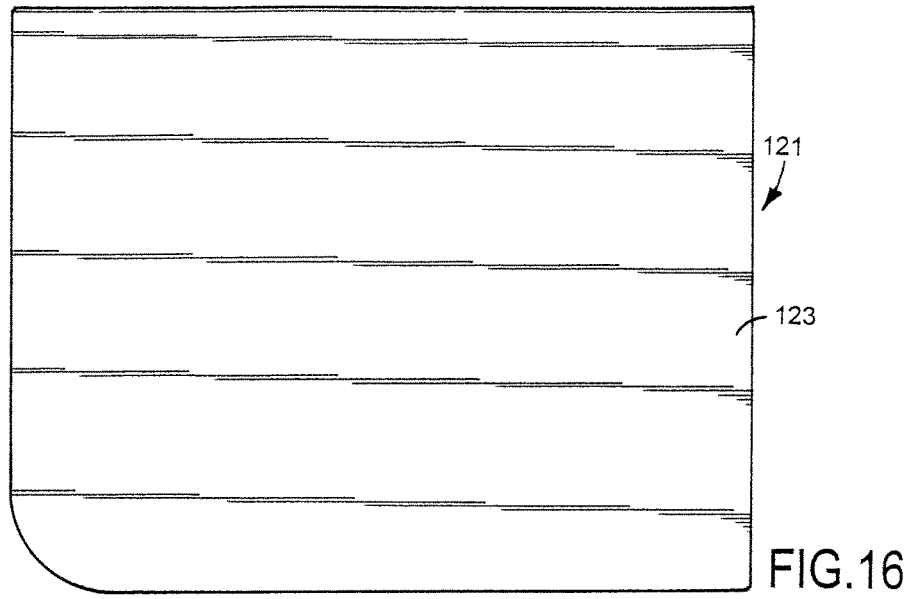
FIG. 16 is an enlarged top plan view of the debris deflector and knife apparatus of FIG. 12.
Figure 17:
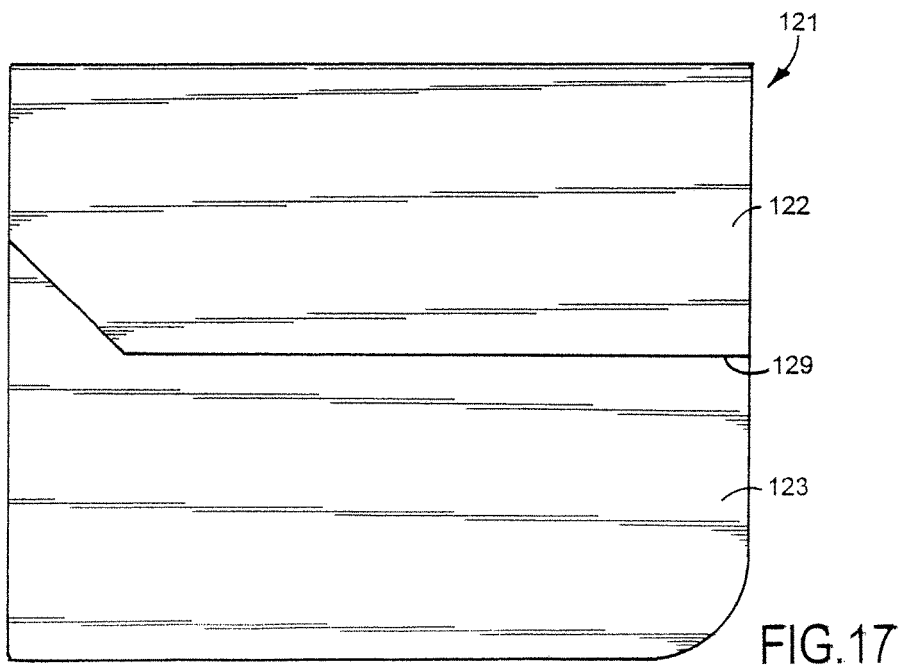
FIG. 17 is an enlarged bottom plan view of the debris deflector and knife apparatus of FIG. 12.
Figure 18:
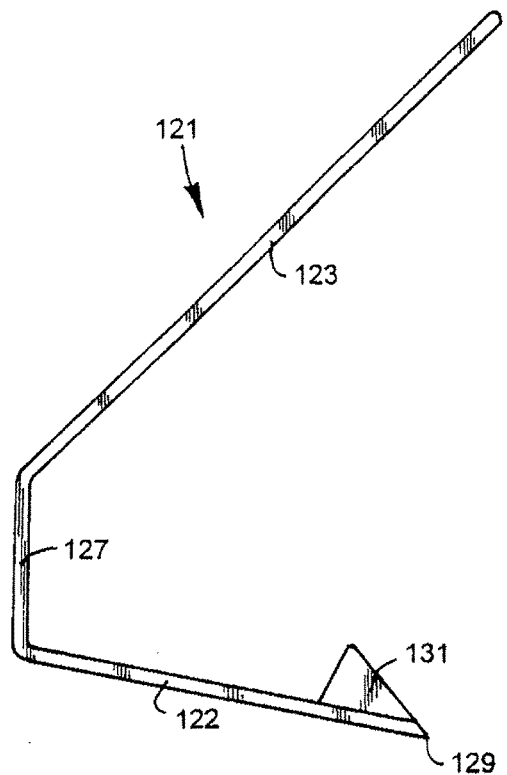
FIG. 18 is an enlarged side elevational view of the left side of the debris deflector and knife apparatus of FIG. 12.
Figure 19:
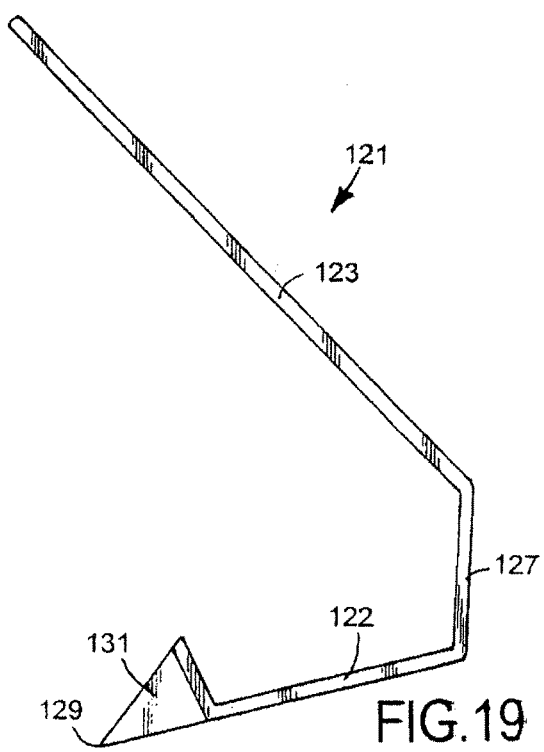
FIG. 19 is an enlarged side elevational view of the right side of the debris deflector and knife apparatus of FIG. 12.
Figure 20:
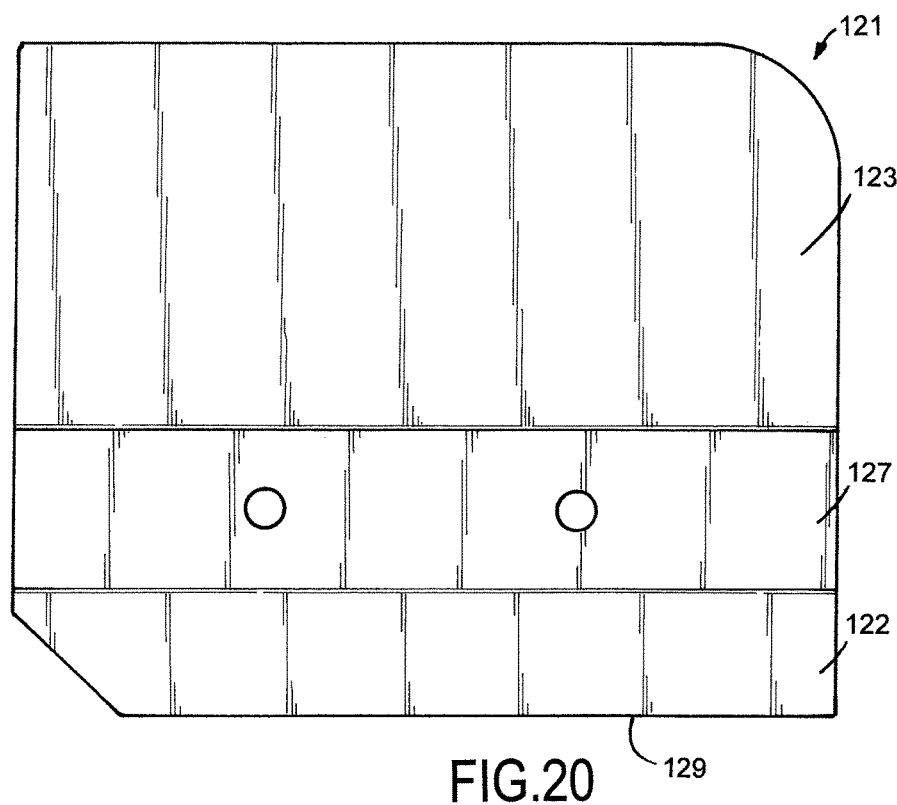
FIG. 20 is an enlarged rear elevational view of the debris deflector and knife apparatus of FIG. 12.
Figure 21:
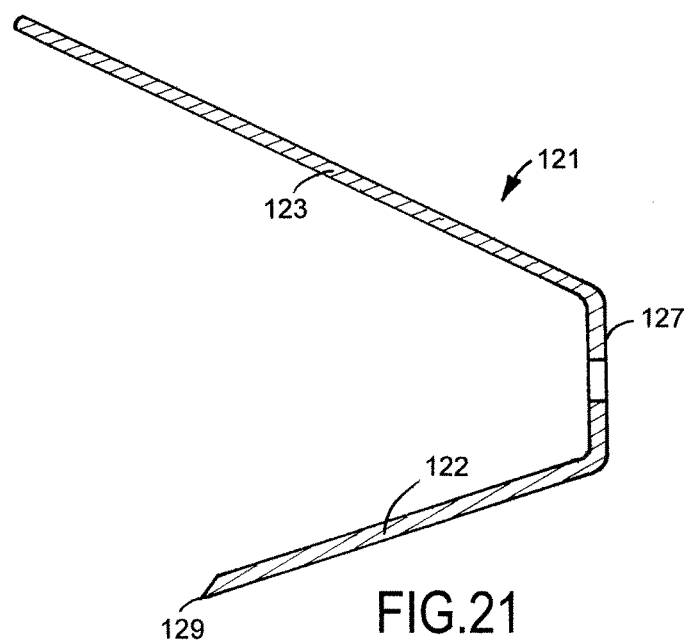
FIG. 21 is a sectional view taken along the line 21-21 of FIG. 15.

Deflector 23 has a support or member 38 and an upwardly directed front member 39. Member 38 is a flat metal plate. Front member 39 is a generally flat plate having a front face located above shroud 14 and knife 22. Fasteners 36 and 37 secured member 38 to top wall 28, as shown in FIGS. 5 and 6. Member 38 has a pair of holes 41 and 42 accommodating fasteners 36 and 37. Other connections, such as welds, can be used to secure front member 39 to knife 22. Deflector 23 can be mounted directly on top wall 24 of shroud 14. Deflector front member 39 has a width of 10 cm and extends upwardly and forwardly at an angle of 45 degrees from the horizontal top wall 24 of shroud 14. Front member 39 can have other sizes, shapes and upright inclinations. As shown in FIGS. 9 and 10, front member 39 has a flat continuous face to deflect cut debris away from workperson's legs 19 and feet 20. Also, sticks, stones and dirt are carried by the moving cut debris and air laterally of shroud 14. The vegetation moved by the revolving cord 17 into contact with knife edge 30, 31 results in a clean straight cut of the top ends of grass. The ends of the grass are not shredded and do not expose strings of grass ends to atmosphere. The cutting of the vegetation is effective and efficient with low motor power requirements.

A second embodiment of the knife and deflector apparatus 121, shown in FIGS. 11 to 21, mounted on a shroud 14 of a string trimmer 10 in use directs cut debris 118 away from legs 19 and feet 20 of workperson 12. Apparatus 121 has a knife member 122 having a front linear radial knife edge 129. The inner end of knife member 122 has an upwardly turned ear 131 that deflects cord 17 away from knife edge 129. A back wall 127 joins knife member 122 to a front wall of deflector 123. Knife and deflector apparatus 121 is a one-piece metal member attached to a front wall 126 of shroud 14 with fasteners 128, shown as nut and bolt assemblies. Knife member 122, as seen in FIGS. 13, 18, 19 and 21, extends downwardly and forwardly locating knife edge below the bottom horizontal plane of a shroud 14. Knife member 122 is inclined 15 to 20 degrees downwardly and forwardly of the front of shroud 14. Front wall 123 has a continuous flat face that directs cut debris laterally away from shroud 14 and workperson 12. Front wall 123 extends upwardly and forwardly at an angle of 45 degrees relative to the horizontal plane of shroud 14. Other sizes and angles of front wall 123 can be used to deflect cut debris away from workperson 12.

An example of knife and deflector apparatus 121 is a one-piece sheet metal member of stainless steel, shown in FIGS. 14 to 21, with a length of 13 cm. The back wall 127 is a support having a width of 3 cm with opposite edges joined to knife member 122 and front wall 123. Knife wall 122 has a width of 6 cm with ear 131 being a triangular-shaped member having a height of 1 cm. The front wall 123 has a width of 10 cm.

Figure 22:
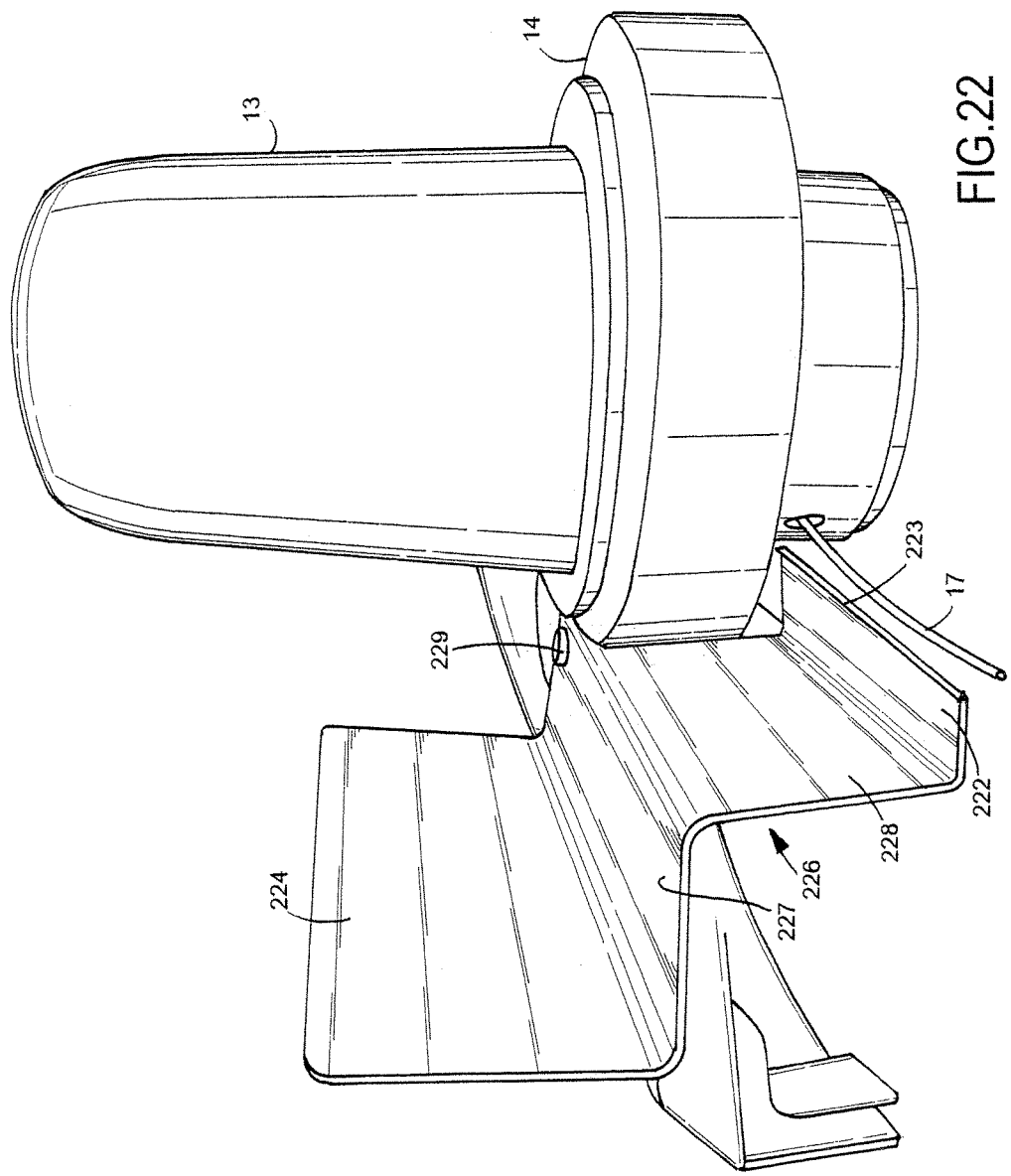
FIG. 22 is a perspective view of a grass trimmer head with a third embodiment of a debris deflector and knife apparatus attached to the shroud of the grass trimmer.
Figure 23:
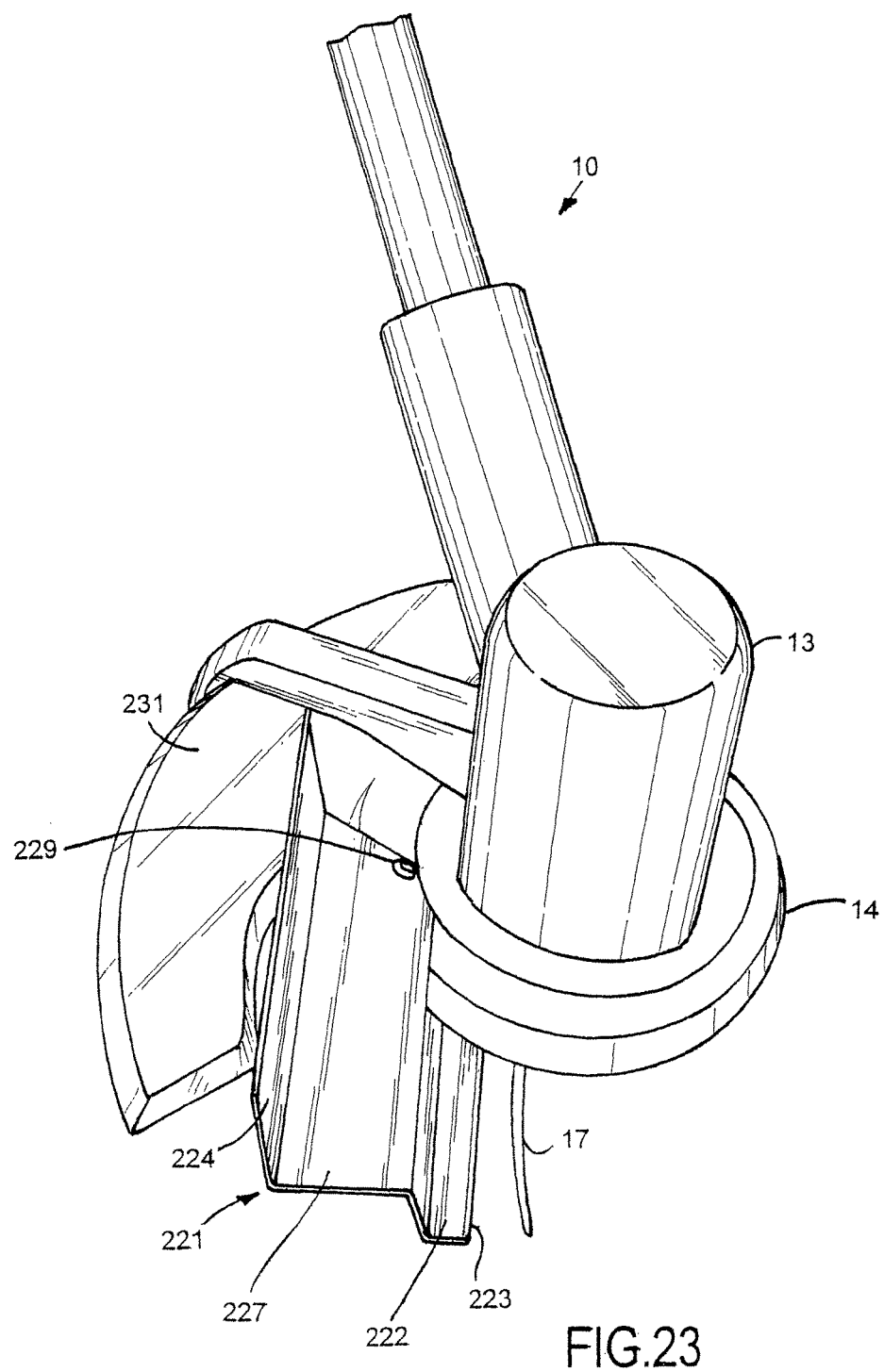
FIG. 23 is a top plan view of FIG. 22.

A third embodiment of the knife and deflector unit 221, shown in FIGS. 22 and 23, mounted on shroud 14 directs cut debris laterally away form shroud 14 and the workperson operating the string trimmer. Knife and deflector apparatus 221 is a one-piece metal member with a horizontal knife 222 having a radial cutting edge 223 located below shroud 14 and above the circular path of moving cord 17. Cord 17 operates to move vegetation, including grass, weeds, hay and plants, into contact with edge 223 and cutting the vegetation into cut debris. A radial deflector 224 extended upwardly from shroud 14 has a generally flat front surface or face that directs air and cut debris laterally away from shroud 14 and the workperson operating the string trimmer. A horizontal support member 227 and a downwardly directed member 228 joins knife 222 to deflector 224. Member 228 has a generally flat radial surface or face that also directs air and cut debris laterally away from shroud 14. Knife and deflector apparatus 221 is pivotally mounted on shroud 14 with a pivot member 229, shown as a nut and bolt assembly. Pivot member 229 allows knife and deflector apparatus 221 to be angularly adjusted on shroud 14 to change the circumferential location of radial cutting edge 223. Additional fasteners can be used to fix the location of knife and deflector on shroud 14.

Figure 24:
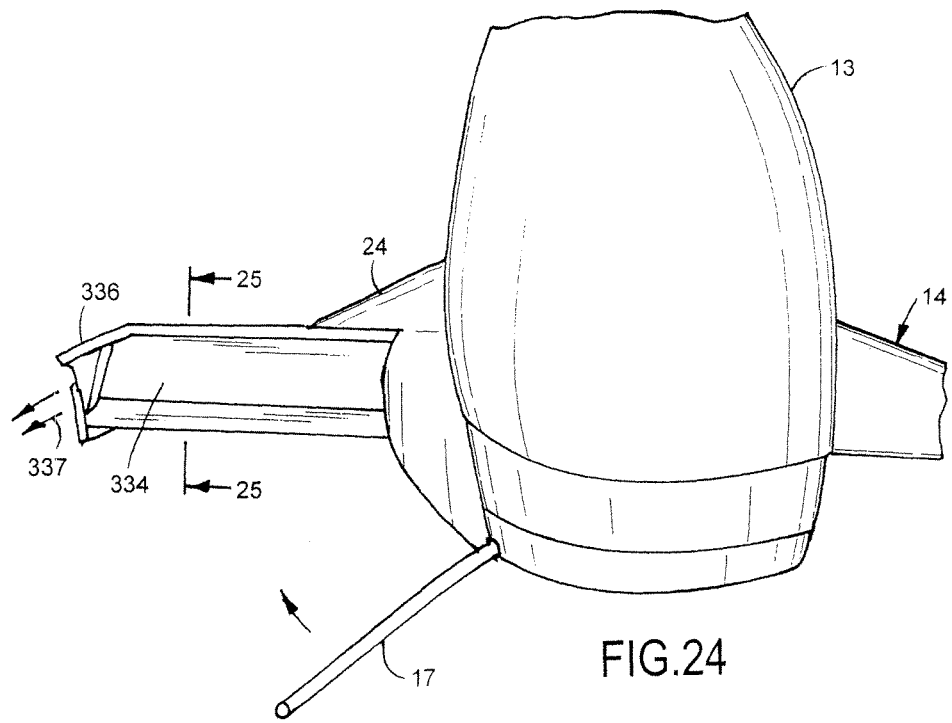
FIG. 24 is a front elevational view of a debris deflector mounted on the shroud of a string trimmer.
Figure 25:
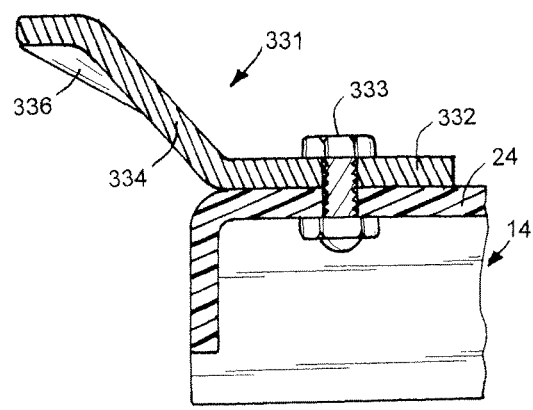
FIG. 25 is a sectional view taken along line 25-25 of FIG. 24.
Figure 34:
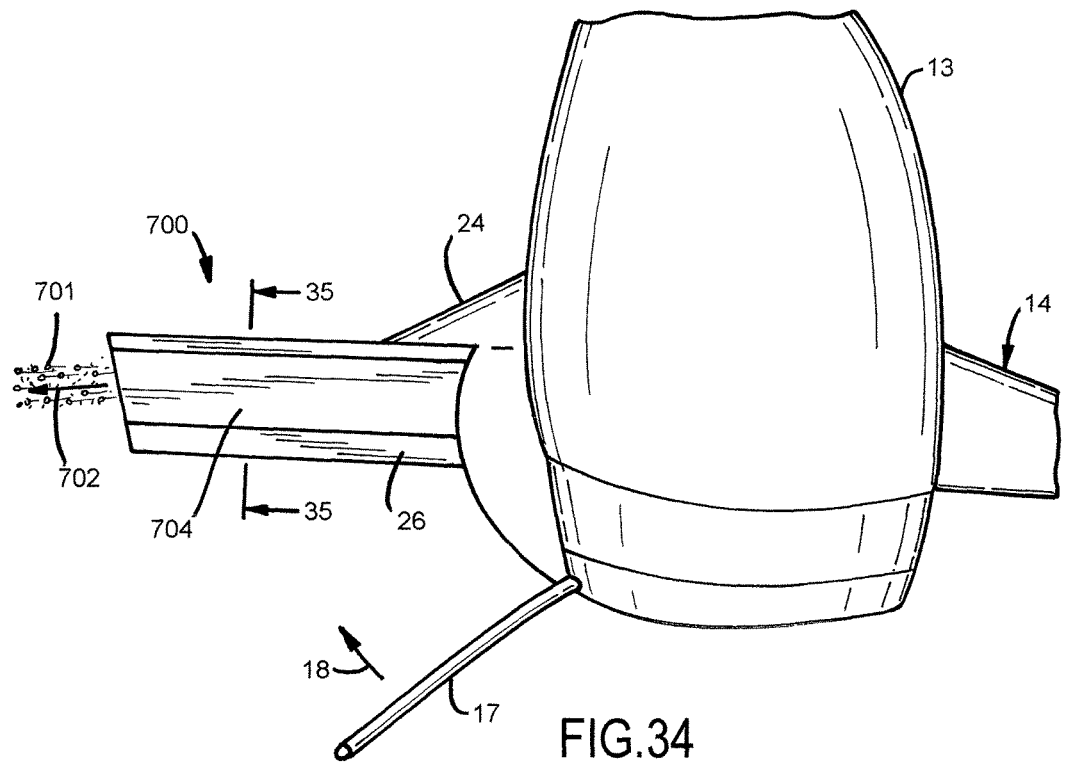
FIG. 34 is a perspective view of a string trimmer equipped with an eighth embodiment of a debris deflector.
Figure 35:
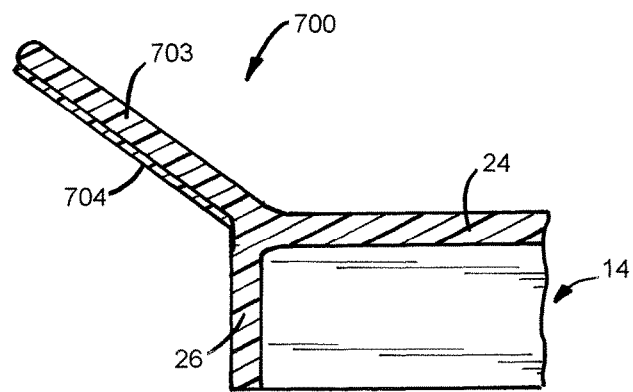
FIG. 35 is an enlarged sectional view taken along the line 35-35 of FIG. 34.

A fourth embodiment of the debris deflector 331, shown in FIGS. 24 and 25, is mounted on shroud 14 of a string trimmer to direct air and cut debris laterally away from shroud 14 and housing 13 of the string trimmer and from the workperson operating the string trimmer. Deflector 331 is a one-piece metal member having a flat horizontal support 332 secured with a fastener 333, shown as a nut and bolt assembly, to the top wall 24 of shroud 14. A plurality of fasteners can be used to attach support 332 to top wall 24. An upwardly extended radial plate 334 is integral with the forward portion of support 332. Plate 334 is inclined upwardly and forwardly at an angle of about 45 degrees. Plate 334 can have other angles of inclination. The outer upper end of plate 334 has a downwardly curved ear 336. The cut debris 337 is directed outwardly and downwardly by the front face of plate 334 and ear 336. Base 332 can be attached with an adhesive or bonding material to the top wall 24 of shroud 14. Plate 334 can be an upwardly radial extension of the top wall 24 of shroud 14 as shown in FIGS. 34 and 35.

Figure 26:
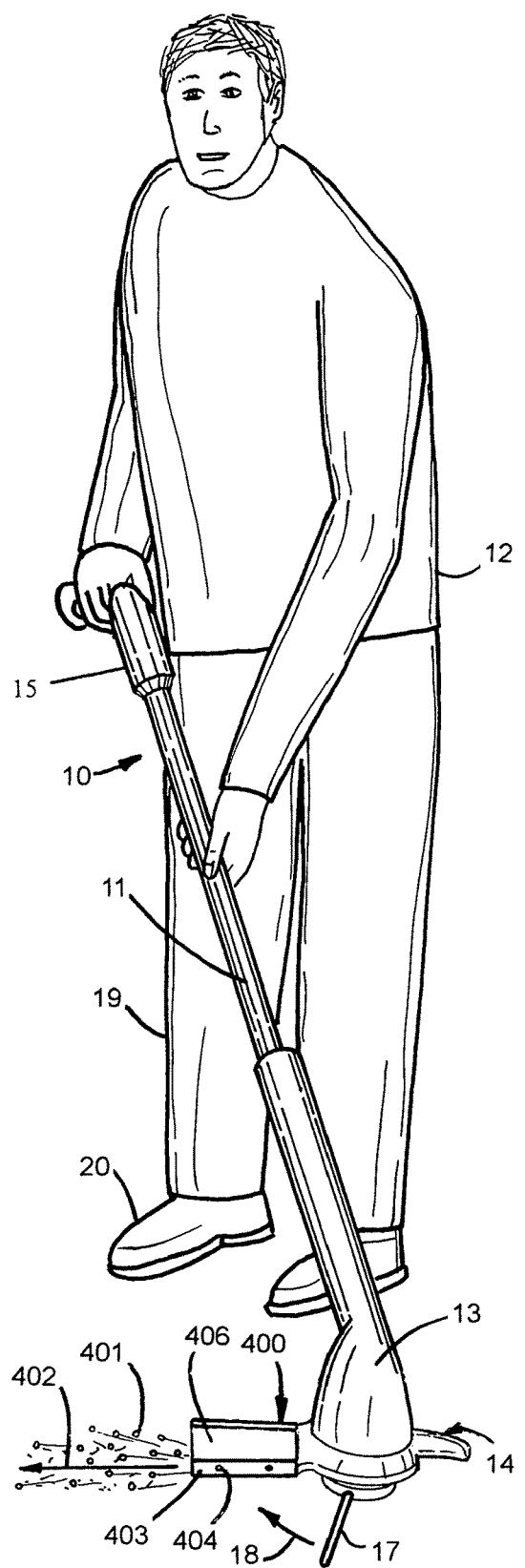
FIG. 26 is a perspective view of a string trimmer equipped with a fifth embodiment of a debris deflector used by a workperson for cutting grass.
Figure 27:
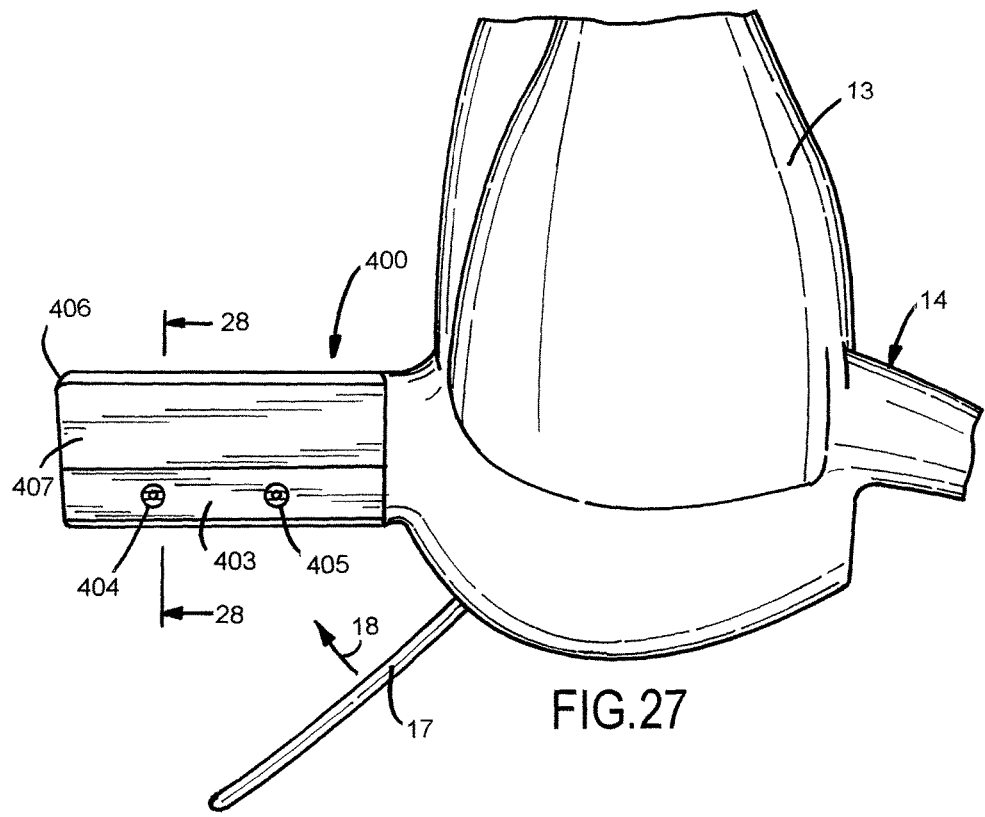
FIG. 27 is an enlarged front elevational view of the debris deflector of FIG. 26 mounted on the shroud of the string trimmer.
Figure 28:
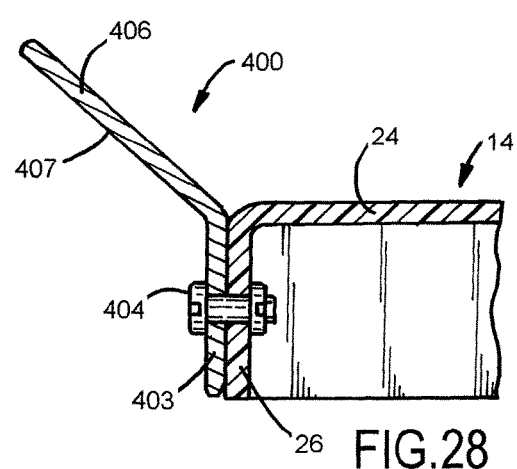
FIG. 28 is an enlarged sectional view taken along line 28-28 of FIG. 27.

A fifth embodiment of the debris deflector 400, shown in FIGS. 26, 27 and 28, is mounted on the shroud 14 of a conventional string trimmer 10 having a wand or tubular member 11 held by a workperson 12. Wand 11 is connected to a housing 13. A cutting head 16 with flexible filaments 17, such as plastic cords and strings, is located below housing 13. Alternative cutting heads are equipped with blades and knives that extended radially from the cutting head. A motor 15 drivably connected to the cutting head 16 is operated to rotate the filaments 17, as shown by arrow 18, in a circular plane or path below shroud 14. Deflector 400 mounted on shroud 14 directs cut debris and objects 401, such as dust, dirt, sticks, stones and the like, in an outward lateral direction, shown by arrow 402, away from the legs 19 and feet 20 of workperson 12.

Deflector 400, shown in FIGS. 27 and 28, is a one-piece rigid member comprising a plate 406 joined to a support 403. Plate 406 is a metal member. Other materials including plastic, carbon fiber reinforced plastic can be used to fabricate plate 406. As shown in FIG. 28, plate 406 extends upwardly and outwardly at an angle of 45 degrees. Plate 406 can extend outwardly at other angles relative to the circular plane of rotation of the cutting flexible filaments 17. A plurality of fasteners 404 and 405 secure support 403 to a front wall 26 of shroud 14. Front wall 26 is joined to top wall 24 of shroud 14 and extends in an outward radial direction relative to the axis of rotation of the cutting head and flexible filament 17. Plate 406 extends upwardly and outwardly from support 403 along the radial length of front wall 26 of shroud 14. Plate 406 has a front flat face or surface 407 that deflects moving air, cuts debris and objects 401 in an outward lateral direction shown by arrow 402 in FIG. 26.

Figure 29:
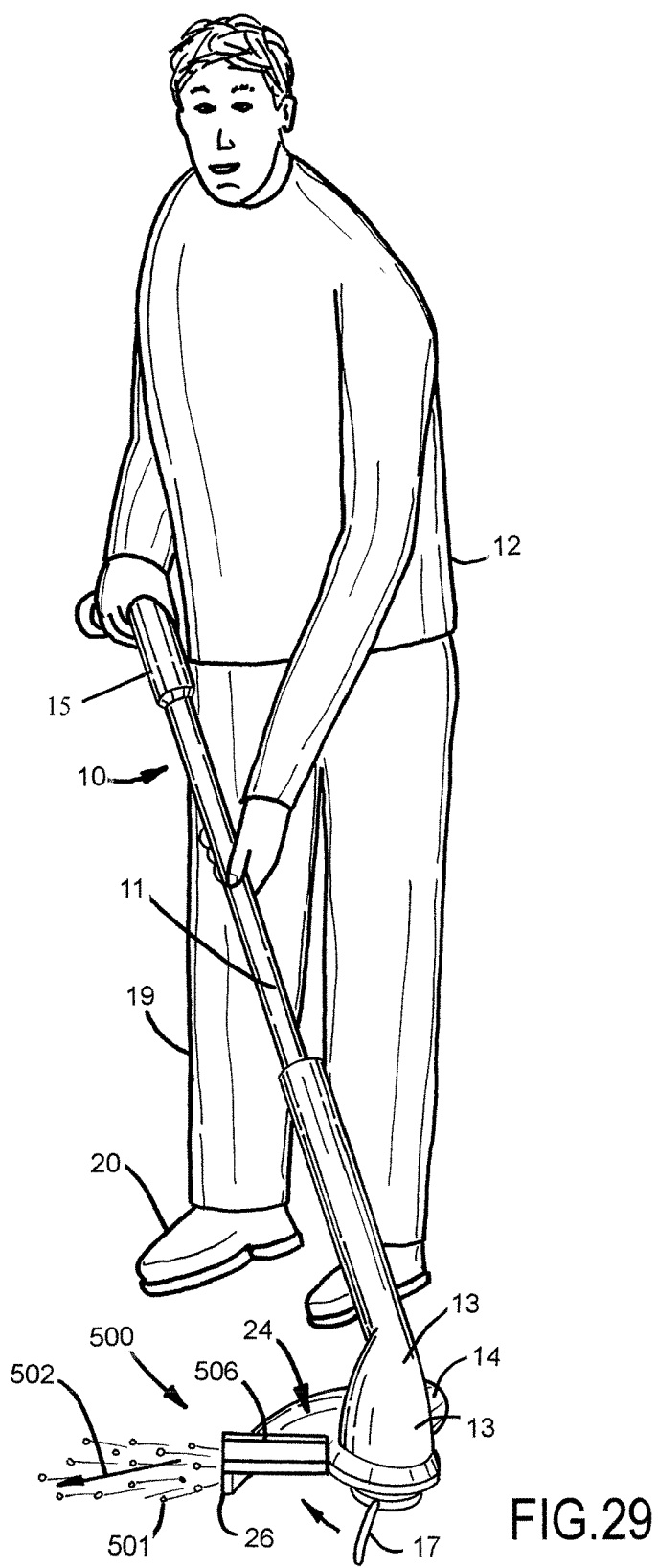
FIG. 29 is a perspective view of a string trimmer equipped with a sixth embodiment of a debris deflector on a shroud used by a workperson for cutting grass.
Figure 30:
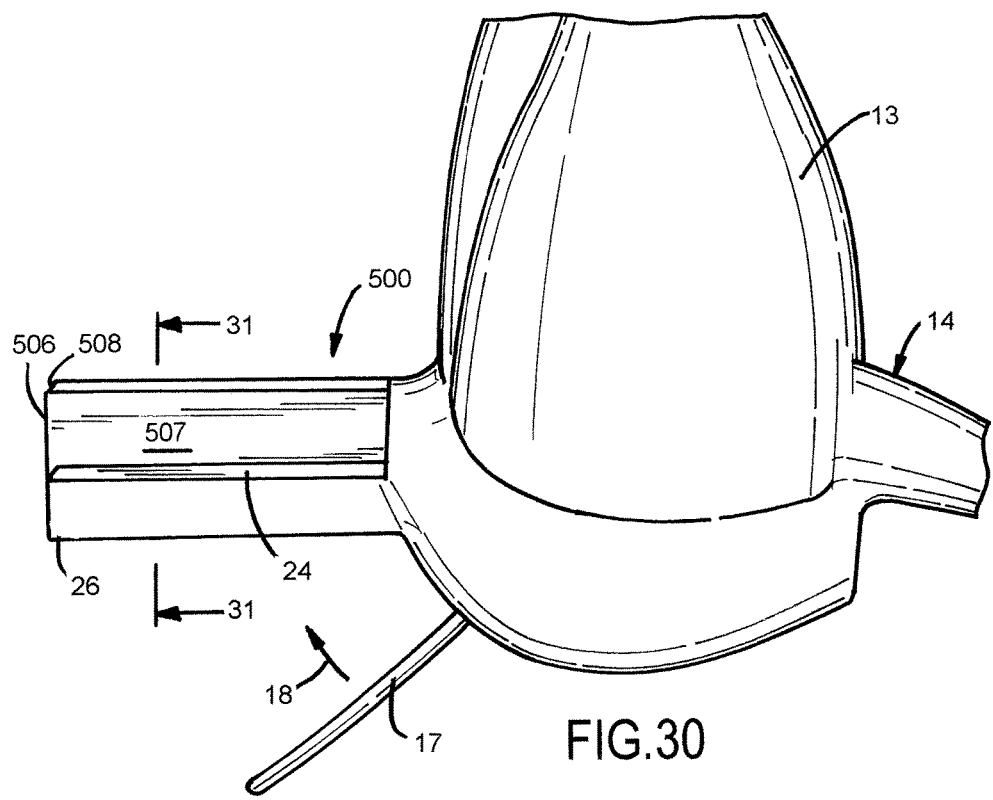
FIG. 30 is an enlarged front elevational view of the debris deflector, shroud and string trimmer of FIG. 29.
Figure 31:
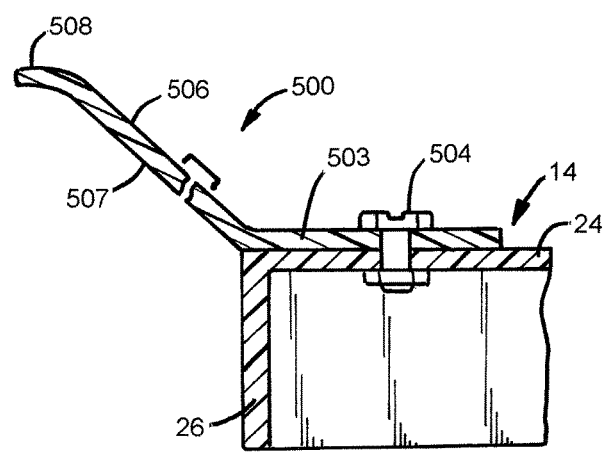
FIG. 31 is an enlarged sectional view taken along line 31-31 of FIG. 30.

A sixth embodiment of the debris deflector 500, shown in FIGS. 29, 30 and 31, is mounted on shroud 14 of a conventional string trimmer 10. String trimmer 10 has the same structures as the string trimmer shown in FIG. 26. The cutting head has radially outwardly directed flexible filaments 17, such as plastic cords or strings that are rotated in a circular plane located below shroud 14 to cut vegetation and direct cut debris and objects 501 laterally away from shroud 14, as shown by arrow 502, and legs 19 and feet 20 of workperson 12. Deflector 500 is a one-piece metal or plastic member having a support 503 secured to the top wall 24 of shroud with a fastener 504, shown as a nut and bolt assembly. A plate 506 joined to support 503 extends upwardly and outwardly away from the outer section of shroud 14. The upper edge section 508 of plate 506 is turned downwardly to direct debris in an outward and downward direction. Plate 506 has a front face or surface 507 extended from the outer edge of top wall 24 of shroud 14 upwardly at an angle of about 45 degrees to and including upper edge section 508. In use, the front wall 26 and plate 506 direct cut debris and objects upwardly and outwardly in a lateral direction away from shroud 14 and the workperson of the string trimmer.

Figure 32:
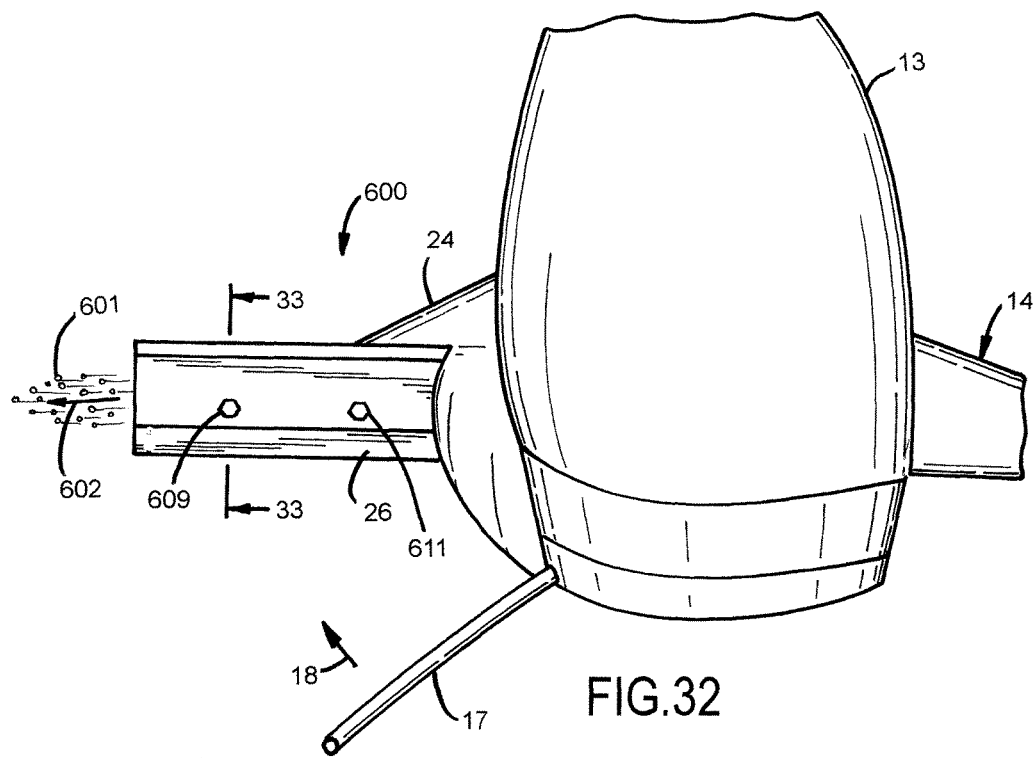
FIG. 32 is a perspective view of a string trimmer equipped with a seventh embodiment of a debris deflector.
Figure 33:
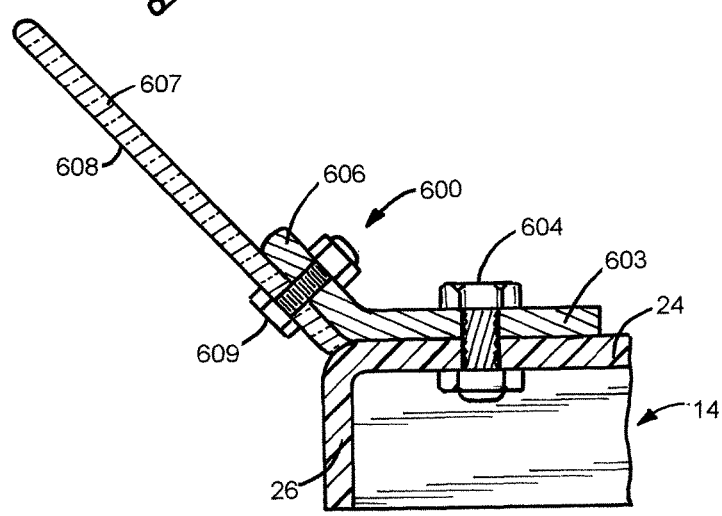
FIG. 33 is an enlarged sectional view taken along line 33-33 of FIG. 32.

A seventh embodiment of the debris deflector 600, shown in FIGS. 32 and 33, is mounted on the shroud 14 of a conventional string trimmer having a cutting head with flexible filaments 17, such as plastic cords and strings. The cutting head filaments 17 are rotated in a circular path below shroud 14 to cut vegetation and direct cut debris and objects 601 laterally away from shroud 14, as shown by arrow 602 in FIG. 32. Deflector 600 has a support 603 attached to the top wall 24 of shroud 14. Support 603 includes an upward and outward extended flange 606 located adjacent the outer edge of shroud 14. A flat plate 607 of transparent plastic is attached to flange 606 with a plurality of fasteners 609 and 611, such as nut and bolt assemblies. Plate 607 has a front flat face or surface 608. Plate 607 can be a metal or composite material member. Fasteners 609 and 611 can be removed from flange 606 to allow replacement of plate 607 with a new plate or a plate having a different size and shape. Plate 607 can have slots for accommodating fasteners, such as bolts and wing nuts, that allow plate 607 to be removed from flange 606. In use, cutting tools 17 rotate in a circular path below shroud 14 to cut vegetation and direct cut debris and objects toward deflector plate 607. The cut debris and objects are moved by flowing air and moving cutting tools 17 to a location laterally of the shroud and workperson.

An eighth embodiment of the debris deflector 700, shown in FIGS. 34 and 35, joined to shroud 14 directs cut debris and objects 701 laterally away from shroud 14, as shown by arrow 702 in FIG. 34. Deflector 700 comprises a plate or flange 703 joined to top wall 24 of shroud 14. Plate 703 and shroud 14 are molded or formed as a one-piece member. Plate 703 and shroud 14 is a reinforced one-piece plastic member. Plate 703 and shroud 14 can be a metal member. Plate 703 extends upwardly and outwardly at an angle of 45 degrees relative to top wall 24 of shroud 14. Plate 703 can extend upwardly and outwardly from shroud 14 at other angles relative to shroud 14. Plate 703 extends radially away from housing 13 along the upper end of front wall 26 of shroud 14 whereby cut debris and objects are directed by front wall 26 and plate 703 laterally away from the outer ends of front wall 26 and plate 703. As shown in FIG. 35, a layer or sheet 704 of low friction material, such as polytetrafluoroethylene is attached to the inside face of plate 703 to inhibit collection of cut debris on plate 703. Layer 704 has low surface resistance to movement of art debris and objects that contact layer 704.

Figure 36:
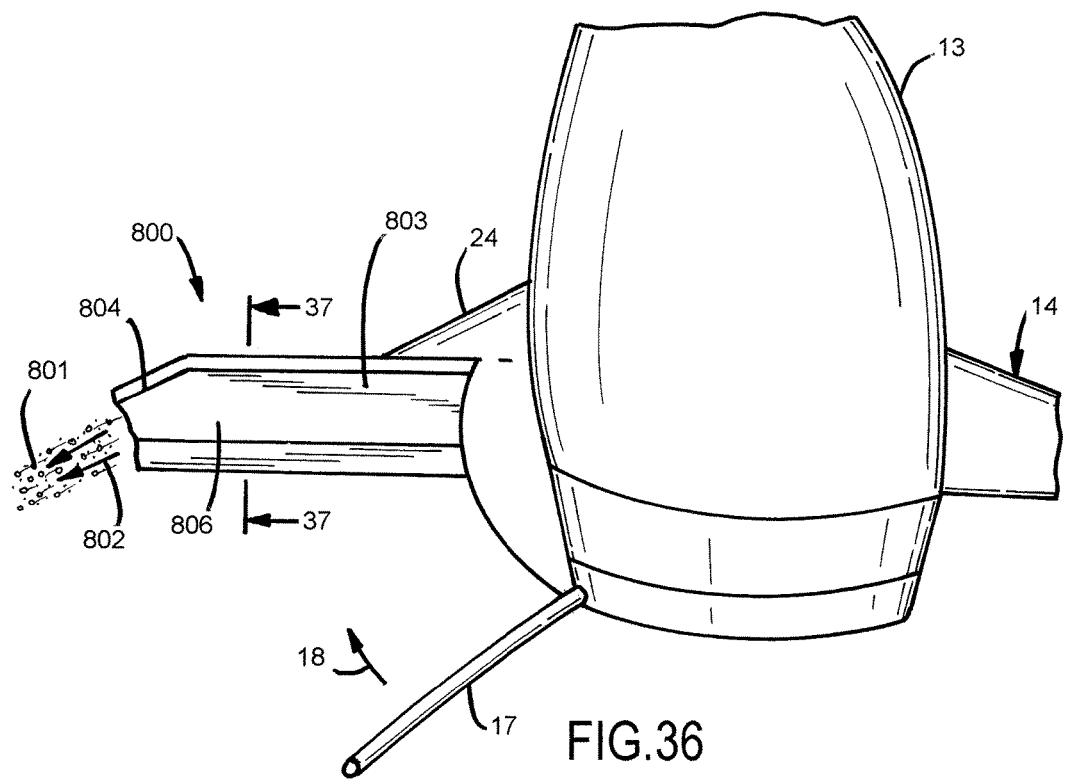
FIG. 36 is a perspective view of a string trimmer equipped with a ninth embodiment of a debris deflector.
Figure 37:
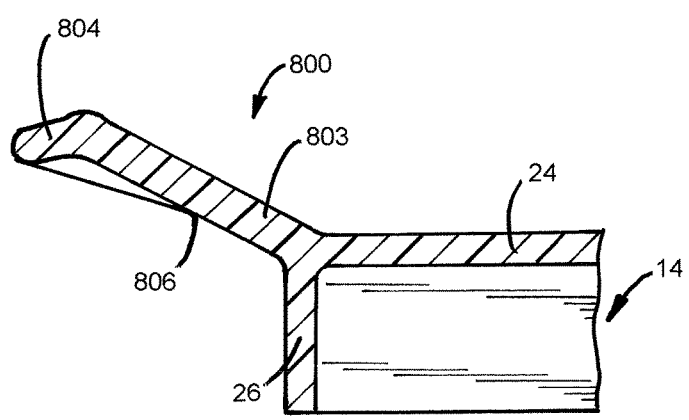
FIG. 37 is an enlarged sectional view taken along line 37-37 of FIG. 36.
Figure 38:
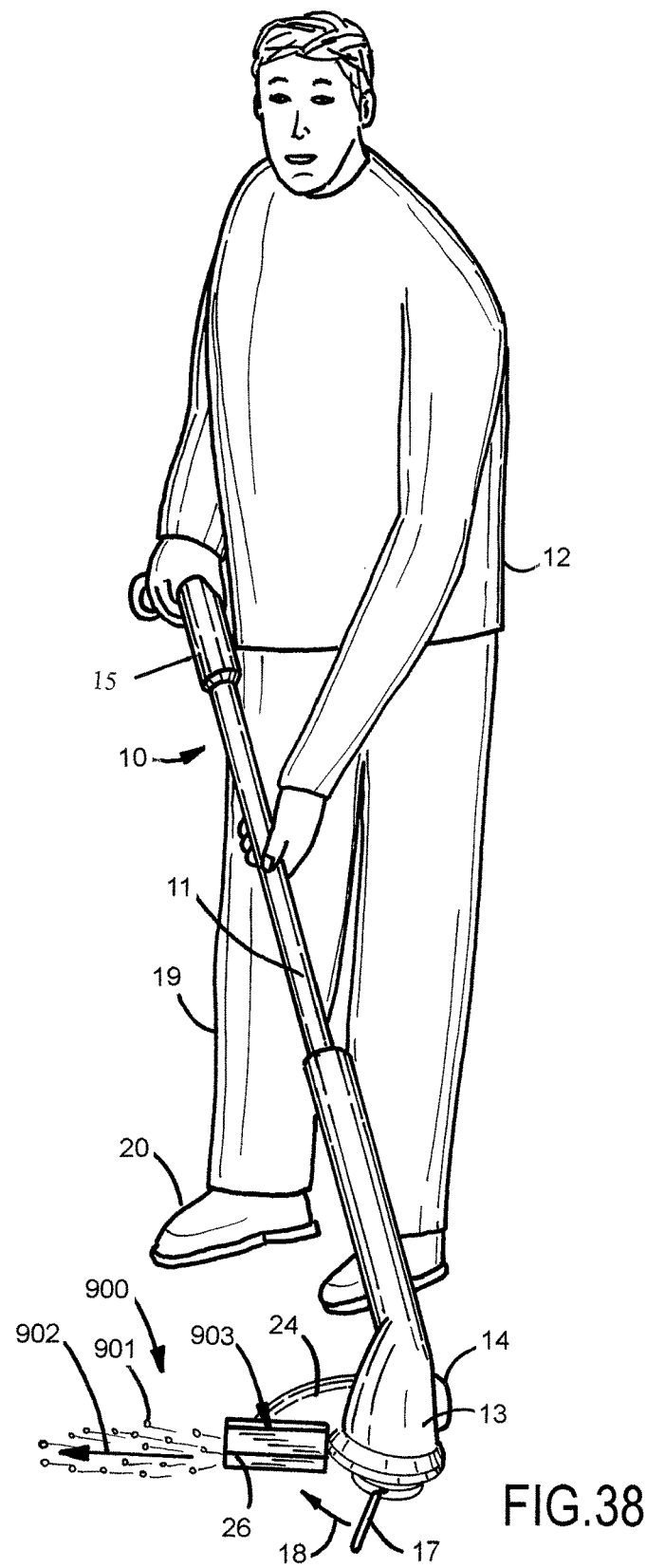
FIG. 38 is a perspective view of a string trimmer equipped with a tenth embodiment of a debris deflector.
Figure 39:
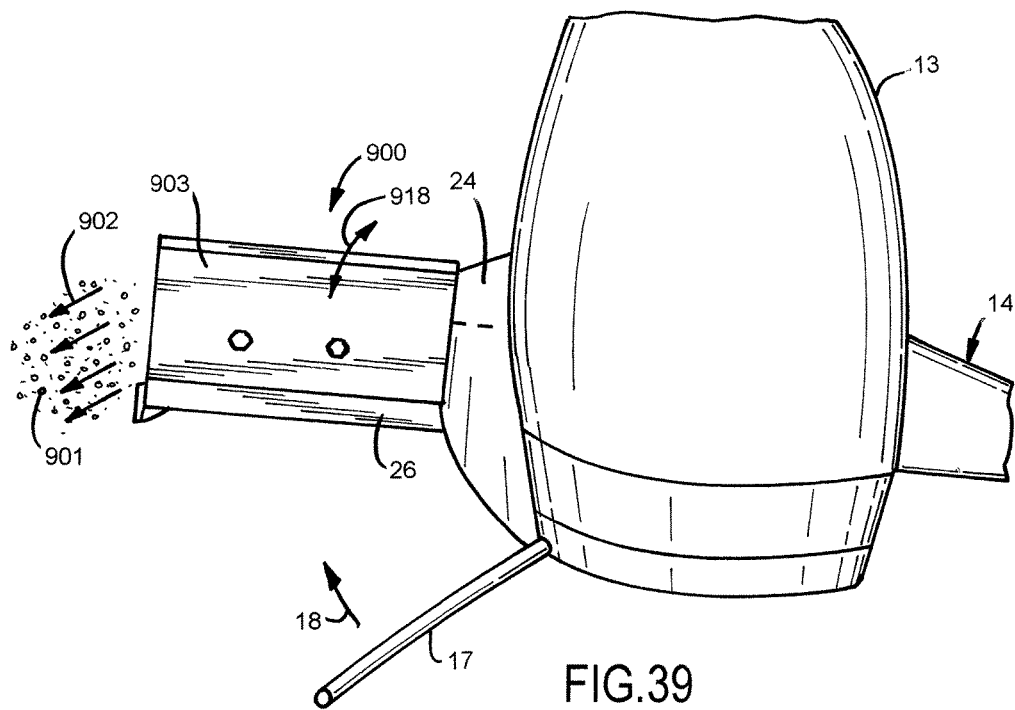
FIG. 39 is an enlarged front elevational view of the debris deflector mounted on the shroud of the string trimmer.
Figure 40:
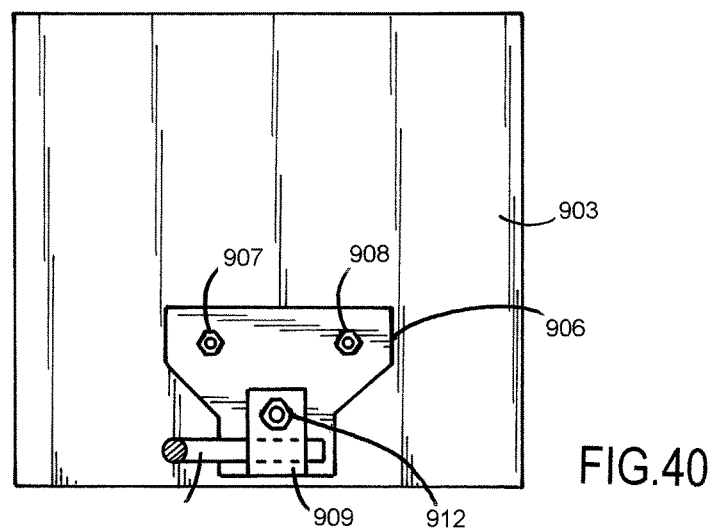
FIG. 40 is a rear elevational view of the debris deflector plate of the debris deflector shown in FIG. 39.

A ninth embodiment of the debris deflector 800, shown in FIGS. 36 and 37, joined to shroud 14 directs cut debris and objects 802 laterally away from shroud 14, as shown by arrow 802 in FIG. 36. Deflector 800 comprises a plate or flange 803 joined to top wall 24 of shroud 14. Plate 803 extends upwardly and outwardly from the front wall 26 of shroud 14. Plate 803 extends along the radial length of the upper portion of front wall 26 of shroud 14. The outer end section 804 of plate 803 is curved downward to direct cut debris 801 in a lateral downward direction, shown by arrows 802 in FIG. 36, away from shroud 14 and the workperson of the string trimmer. The cutting tool 17 moves in a circular path shown by arrow 18 below shroud 14 and deflector 800 to cut vegetation into cut debris. The moving cutting tool 17 along with flowing air directs cut debris and objects toward front wall 26 and front surface 806 of plate 803. The cut debris and objects are discharged from deflector 800 to a location laterally away from the deflector 800 and shroud 14.

A tenth embodiment of the debris deflector 900, shown in FIGS. 38 to 43, is mounted on a shroud 14 of a string trimmer 10. String trimmer 10 has a wand 11 connected at its lower end to a housing 13 supporting a shroud 14. A motor 15 mounted on wand 11 is drivably connected to a rotatable cutting head having a plurality of cutting tools, such as plastic cords, strings or blades. The cutting head and cutting tools are rotated in a circular path, shown by arrow 18, to cut vegetation and direct cut debris and objects toward deflector 900. The deflector 900 directs the cut debris and objects 901 away from deflector 900, as shown by arrow 902 in FIG. 38, and away from the legs 19, feet 20 of workperson 12. Deflector 900 comprises a generally flat plate 903. Plate 903 is a rigid transparent plastic member. Plate 903 can be a metal member. A hinge assembly 904 connects plate 903 to top wall 24 of shroud 24. Hinge assembly 904 allows plate 903 to be angularly adjusted, as shown by arrow 918 in FIG. 39. Plate 903 can be moved back to a position adjacent the top wall 24 of shroud 14. Hinge assembly 904 comprises a member 906 secured to the back of plate 903 with a plurality of fasteners 907 and 908. Plate 906 has a lower end section 909 turned about a rod 911. A fastener 912 clamps end section 909 onto rod 911 as shown in FIG. 42. Rod 911 is joined to a leg 913 of U-shaped member 914. A bracket 916 extended over U-shaped member 914 is clamped against top wall 24 of shroud 14 with a fastener 917, as shown in FIG. 43. The bracket 916 and fastener 917 allows the position of U-shaped member 914 to be adjusted on the top wall 24 of shroud 14 to change the position of plate 903 relative to shroud 14. Other types of hinge assemblies can be used to connect plate 903 to top wall 24 or the front wall 26 of shroud 14.

Several embodiments of the knife and deflector assembly and debris deflector have been shown and described as preferred examples of the invention. Changes in shape, size, materials, and arrangement of parts may be made by persons skilled in the art without departing from the scope and substance of the invention.

The invention claimed is:

1. A string trimmer for use by an operator for cutting vegetation comprising:
  a housing,
  a rotatable head mounted on the housing,
  said head including an elongated cord extended outward from the head,
  a motor operatively connected to the head for rotating said head and cord in a circular path having first and second sections whereby the rotating cord cuts vegetation into cut debris and moves air and cut debris outward away from the head and the cord,
  a shroud mounted on the housing above the head and cord,
  said shroud being located over the first section of the circular path of rotation of the cord and spaced from the second section of the circular path of rotation of the cord, said shroud having a first side member and a second side member with the head located between the first and second side members,
  said cord when rotated in the circular path moves from adjacent the first side member to adjacent the second side member of the shroud and cuts debris and moves cut debris and air outward away from the shroud and toward the second side member,
  a debris deflector mounted only on the second side member of the shroud above the circular path of rotation of the cord for directing the cut debris and air moved by the cord rotating in the circular path toward the second side member of the shroud outward away from the second side member of the shroud,
  said debris deflector comprising a plate and a member, said plate being joined to the member of the debris deflector, said plate having a face extended outward and upwardly in a forward direction from the second side member of the shroud, and at least one fastener securing the member of the debris deflector to the second side member of the shroud thereby connecting the debris deflector to the shroud.

2. The string trimmer of claim 1 wherein:

the face of the plate has a flat front surface for directing the cut debris and air outward away from the shroud.

3. The string trimmer of claim 1 wherein:

the second side member of the shroud includes a side wall, the member of the debris deflector engages the side wall.

4. The string trimmer of claim 1 wherein:

said plate joined to the member extends at an obtuse angle relative to the member of the debris deflector.

5. The string trimmer of claim 1 wherein:

the plate and member of the debris deflector comprise a one-piece structure.

6. A string trimmer for use by an operator to cut vegetation comprising:

a support, a rotatable head mounted on the support, at least one elongated cord attached to the head and extended in an outward direction from the head, a motor operatively connected to the head for rotating said head and cord in a circular path having a first section and a second section spaced from the first section whereby the rotating cord cuts vegetation into cut debris and moves air and cut debris in the outward direction away from the head and cord, a shroud mounted on the support above the head and cord, said shroud having a top wall, said first section of the circular path of rotation of the cord being located under the top wall, said second section of the circular path of rotation of the cord being spaced from the shroud, said shroud including a first side member and a second side member opposite the first side member, said head being located between the first and second side members of the shroud, said cord when rotated in the second section of the circular path moves from adjacent the first side member to adjacent the second side member of the shroud and cuts debris and moves cut debris and air outward direction, a debris deflector secured only to the second side member of the shroud via at least one fastener for directing the cut debris and air moved by the cord rotating in the second section of the circular path of rotation of the cord toward the second side member of the shroud in the outward direction away from the second side member of the shroud.

7. The string trimmer of claim 6 wherein:

the debris deflector includes a plate, a member joined to the plate, and said at least one fastener securing the member of the debris deflector to the second side member of the shroud.

8. The string trimmer of claim 6 wherein:

the debris deflector includes a plate having a face extended in the outward direction and an upwardly forward direction from the second side member of the shroud.

9. The string trimmer of claim 8 wherein:

the face of the plate has a flat front surface for directing the cut debris and air in the outward direction away from the shroud.

10. The string trimmer of claim 8 wherein:

the debris deflector includes a member joined to the plate, and said at least one fastener securing the member of the debris deflector to the second side member of the shroud.

11. The string trimmer of claim 8 wherein:

the debris deflector includes a member joined to the plate, said plate extending at an obtuse angle relative to the member of the debris deflector, and said at least one fastener securing the member of the debris deflector to the second side member of the shroud.

12. The string trimmer of claim 8 wherein:

the debris deflector includes a flat member joined to the plate, said flat member of the debris deflector and plate comprising a one-piece structure, and said at least one fastener securing the member to the debris deflector to the second side member of the shroud.

13. A shroud and debris deflector for a string trimmer having a head and at least one cord connected to the head adapted to rotate in a circular path having first and second sections whereby the rotating cord cuts vegetation into cut debris and moves air and cut debris in an outward direction away from the head and cord, characterized by:

a shroud having a first side member and a second side member located opposite the first side member, and a debris deflector secured only to the second side member of the shroud via the means securing the debris deflector to the second side member of the shroud.

14. The shroud and debris deflector of claim 13 wherein:

the debris deflector includes a plate having a face extended in the outward direction and an upwardly forward direction from the second side member of the shroud.

15. The shroud and debris deflector of claim 14 wherein:

the face of the plate has a flat front surface for directing the cut debris and air in the outward direction away from the second side member of the shroud.

16. The shroud and debris deflector of claim 13 wherein:

the means securing the debris deflector to the second side member of the shroud comprises at least one structure mounting the debris deflector on the second side member of the shroud.

17. The shroud and debris deflector of claim 13 wherein:

the debris deflector includes a plate adapted to direct cut debris and air in the outward direction away from the second side member of the shroud.

* * * * *